(12) United States Patent
Beck et al.

(10) Patent No.: US 9,178,215 B2
(45) Date of Patent: Nov. 3, 2015

(54) MIXED METAL OLIVINE ELECTRODE MATERIALS FOR LITHIUM ION BATTERIES HAVING IMPROVED SPECIFIC CAPACITY AND ENERGY DENSITY

(75) Inventors: Larry W. Beck, Ann Arbor, MI (US);
Chuanjing Xu, Ann Arbor, MI (US);
Young-Il Jang, Newtonville, MA (US)

(73) Assignee: A123 Systems LLC, Livonia, MI (US)

( * ) Notice: Subject to any disclaimer, the term of this patent is extended or adjusted under 35 U.S.C. 154(b) by 348 days.

(21) Appl. No.: 12/868,530

(22) Filed: Aug. 25, 2010

(65) Prior Publication Data

US 2011/0052988 A1 Mar. 3, 2011

Related U.S. Application Data

(60) Provisional application No. 61/236,862, filed on Aug. 25, 2009.

(51) Int. Cl.
*H01M 4/13* (2010.01)
*H01M 4/58* (2010.01)
*H01B 1/12* (2006.01)

(52) U.S. Cl.
CPC ............ *H01M 4/5825* (2013.01); *H01B 1/122* (2013.01)

(58) Field of Classification Search
USPC ........................................................ 429/221
See application file for complete search history.

(56) References Cited

U.S. PATENT DOCUMENTS

| | | | |
|---|---|---|---|
| 3,070,423 A | 12/1962 | Alexander et al. | |
| 3,407,034 A | 10/1968 | Bennetch et al. | |
| 4,144,163 A | 3/1979 | Kolm | |
| 4,374,109 A | 2/1983 | Ruszala et al. | |
| 5,030,285 A | 7/1991 | Vallvey et al. | |
| 5,053,297 A | 10/1991 | Yamahira et al. | |
| 5,278,000 A | 1/1994 | Huang et al. | |
| 5,691,083 A | 11/1997 | Bolster | |
| 5,910,382 A | 6/1999 | Goodenough et al. | |
| 6,514,640 B1 | 2/2003 | Armand et al. | |
| 6,528,003 B1 | 3/2003 | Sano et al. | |
| 6,599,662 B1 | 7/2003 | Chiang et al. | |

(Continued)

FOREIGN PATENT DOCUMENTS

| | | |
|---|---|---|
| CN | 1105047 A | 7/1995 |
| CN | 101172595 A | 5/2008 |

(Continued)

OTHER PUBLICATIONS

International Search Report and Written Opinion for International Application No. PCT/US2010/046646 mailed Oct. 18, 2010. 7 pages.

(Continued)

*Primary Examiner* — Jennifer A Smith
*Assistant Examiner* — Anita Nassiri Motlagh
(74) *Attorney, Agent, or Firm* — Alleman Hall McCoy Russell & Tuttle LLP

(57) ABSTRACT

Improved positive electrode material and methods for making the same are described. Lithium-iron-manganese phosphate materials, doped with one or more dopant Co, Ni, V, and Nb, and methods for making the same are described. The improved positive electrode material of the present invention is capable of exhibiting improved energy density and/or specific capacity for use in wide range of applications. In certain embodiments, energy density of greater than 340 mWh/g is possible.

27 Claims, 14 Drawing Sheets

(56) References Cited

U.S. PATENT DOCUMENTS

| | | |
|---|---|---|
| 6,656,635 B2 | 12/2003 | Okawa et al. |
| 6,723,470 B2 | 4/2004 | Barker et al. |
| 6,730,281 B2 | 5/2004 | Barker |
| 6,749,967 B2 | 6/2004 | Li et al. |
| 6,787,232 B1 | 9/2004 | Chiang et al. |
| 6,815,122 B2 | 11/2004 | Barker et al. |
| 6,855,273 B2 | 2/2005 | Ravet et al. |
| 6,884,544 B2 | 4/2005 | Barker et al. |
| 7,001,690 B2 | 2/2006 | Barker et al. |
| 7,026,072 B2 | 4/2006 | Barker et al. |
| 7,190,171 B2 | 3/2007 | Kawakami et al. |
| 7,233,128 B2 | 6/2007 | Brost et al. |
| 7,282,300 B2 | 10/2007 | Goh et al. |
| 7,524,529 B2 | 4/2009 | Yang |
| 7,988,879 B2 | 8/2011 | Park et al. |
| 8,187,735 B2 | 5/2012 | Chiang et al. |
| 2002/0004169 A1 | 1/2002 | Yamada et al. |
| 2002/0039687 A1 | 4/2002 | Barker et al. |
| 2004/0005265 A1* | 1/2004 | Chiang et al. .................. 423/306 |
| 2004/0018430 A1 | 1/2004 | Holman et al. |
| 2004/0033360 A1 | 2/2004 | Armand et al. |
| 2004/0086445 A1 | 5/2004 | Armand et al. |
| 2004/0175614 A1 | 9/2004 | Wurm |
| 2004/0257045 A1 | 12/2004 | Sada et al. |
| 2005/0186476 A1 | 8/2005 | Barker et al. |
| 2005/0233219 A1 | 10/2005 | Gozdz et al. |
| 2005/0266303 A1 | 12/2005 | Kadouchi et al. |
| 2006/0093919 A1 | 5/2006 | Wixom et al. |
| 2006/0127750 A1 | 6/2006 | Okada et al. |
| 2006/0127767 A1 | 6/2006 | Gauthier et al. |
| 2007/0015055 A1 | 1/2007 | Lee et al. |
| 2008/0138709 A1 | 6/2008 | Hatta et al. |
| 2008/0274210 A1 | 11/2008 | Chan et al. |
| 2009/0039307 A1 | 2/2009 | Nakaoka et al. |
| 2009/0123813 A1* | 5/2009 | Chiang et al. .................. 429/50 |
| 2009/0186277 A1 | 7/2009 | Beck et al. |
| 2010/0028777 A1 | 2/2010 | Ueda et al. |
| 2010/0178562 A1 | 7/2010 | Exnar et al. |
| 2010/0183924 A1 | 7/2010 | Song et al. |
| 2011/0052988 A1 | 3/2011 | Beck et al. |
| 2011/0068295 A1 | 3/2011 | Beck et al. |
| 2011/0068298 A1 | 3/2011 | Wixom et al. |

FOREIGN PATENT DOCUMENTS

| | | |
|---|---|---|
| CN | 101462704 A | 6/2009 |
| CN | 101481104 A | 7/2009 |
| CN | 101659406 A | 3/2010 |
| GB | 1162711 A | 8/1969 |
| JP | 11021114 A | 1/1999 |
| JP | 2003292309 A | 10/2003 |
| JP | 2004359538 A | 12/2004 |
| JP | 2007128723 A | 5/2007 |
| SU | 01724570 A1 | 4/1992 |
| WO | WO-0230815 A1 | 4/2002 |
| WO | WO-03056646 A1 | 7/2003 |
| WO | WO-03085757 A1 | 10/2003 |
| WO | WO-2005041327 A1 | 5/2005 |
| WO | WO-2010097341 A1 | 9/2010 |

OTHER PUBLICATIONS

Berbenni, et al., "Thermogravimetry and X-ray Diffraction Study of the Thermal Decomposition Processes in Li2CO3-MnCO3 Mixtures", Journal of Analytical and Applied Pyrolysis, 60:45-62 (2002), 19 pages.

International Search Report and Written Opinion for International Application No. PCT/US10/49480 mailed Feb. 1, 2011, 17 pages.

International Search Report and Written Opinion for PCT Application No. PCT/US08/69858 mailed Jan. 20, 2009. 11 pages.

International Search Report issued for PCT/US2009/031552, dated Sep. 1, 2009. 2 pages.

Jang, et al., "Electrochemical Cycling-Induced Spinel Formation in High-Charge-Capacity Orthorhombic LiMnO2", Journal of The Electrochemical Society, 146(9):3217-3223 (1999), 8 pages.

Jang, et al., "Stability of the Monoclinic and Orthorhombic Phases of LiMnO2 with Temperature, Oxygen Partial Pressure, and Al Doping", Solid State Ionics, 130:53-59 (2000), 8 pages.

Lee, et al., "Li2NiO2 as a Novel Cathode Additive for Overdischarge Protection of Li-Ion Batteries", Chem. Matter, 20:5-7 (2008), 4 pages.

Meethong, et al., "Strain Accommodation during Phase Transformations in Olivine-Based Cathodes as a Materials Selection Criterion for High-Power Rechargeable Batteries", Advanced Functional Materials, 17:1115-1123 (2007), 9 pages.

Meethong, Size-Dependent Lithium Miscibility Gap in Nanoscale Li1-$x$FePO4, Electrochemical and Solid State Letters, 10(5):A134-A138 (2007), 5 pages.

Song, Yanning et al. "New Iron (III) Phosphate Phases: Crystal Structure and Electrochemical and Magnetic Properties." *Inorg. Chem.* Oct. 2002. vol. 41. pages 5778-5786.

Striebel et al,, "Comparison of LiFePO4 from Different Sources", Journal of the Electrochemical Society, 152(4) A664-A670 (2005).

Wang et al., "Improving the rate performance of LiFePO4 by Fe-site doping", Electrochimica Acta. vol. 50, No. 14, pp. 2955-2958, May 5, 2005.

Yamada, et al., Phase Diagram of Li$x$(MN$y$FE1-$y$)PO4(0≤$x$,$y$≤1), Journal of The Electrochemical Society, 148(10):A1153-A1158 (2001), 7 pages.

Yonemura et al., "Comparative Kinetic Study of Olivine Li$x$MPO4 (M=Fe, Mn)", Journal of Electrochemical Society 151 (9), A1352-A1356 (2004).

\* cited by examiner

MIXED METAL OLIVINE ELECTRODE MATERIALS FOR LITHIUM ION BATTERIES HAVING IMPROVED SPECIFIC CAPACITY AND ENERGY DENSITY

INCORPORATION BY REFERENCE

All patents, patent applications and publications cited herein are hereby incorporated by reference in their entirety in order to more fully describe the state of the art as known to those skilled therein as of the date of the invention described herein.

CROSS REFERENCE TO RELATED APPLICATION

The present application claims the benefit of the earlier filing date of U.S. Patent Application No. 61/236,862, filed on Aug. 25, 2009, the content of which is hereby incorporated by reference herein in its entirety.

BACKGROUND

Batteries produce energy from electrochemical reactions. Batteries typically include a positive electrode and a negative electrode; an ionic electrolyte solution that supports the movement of ions back and forth between the two electrodes; and a porous separator that ensures the two electrodes do not touch but allows ions to travel back and forth between the electrodes.

Contemporary portable electronic appliances rely almost exclusively on rechargeable lithium (Li)-ion batteries as the source of power. This has spurred a continuing effort to increase their energy storage capability, power capabilities, cycle life and safety characteristics, and decrease their cost. Lithium-ion battery or lithium ion cell refers to a rechargeable battery having a negative electrode capable of storing a substantial amount of lithium at a lithium chemical potential above that of lithium metal. When a lithium-ion battery is charged, lithium ions travel from the positive electrode to the negative electrode. On discharge, these ions return to the positive electrode releasing energy in the process.

In a typical Li-ion battery, the cell includes metal oxides for the positive electrode (or cathode), carbon/graphite for the negative electrode (or anode), and a lithium salt in an organic solvent for the electrolyte. More recently, lithium metal phosphates have been used as a cathode electroactive material.

These Li-ion batteries using lithium iron phosphate (LFP)-based cathode materials are useful in a variety of different application. In certain applications, such as hybrid electric vehicles that charge the batteries through energies collected while the vehicle is braking, batteries that exhibit high specific capacity (or specific power) is desirable as fast recharge and discharge rates of these batteries are important. In other applications, such as plug-in electric vehicles where the distance the vehicle can travel is dependent on the total amount of electrical energy that can be stored in the battery, high energy density (or specific energy) is desirable. Accordingly, materials for Li-ion batteries are optimized for the envisioned particular applications.

SUMMARY

In one aspect, a positive electrode material is provided wherein both the energy density and the specific capacity are optimized to achieve simultaneously a high energy density as well as a high specific capacity.

In one aspect, a positive electrode material is provided wherein the energy density is at least 340 mWh/g at 20C discharge rate. In another aspect, a positive electrode material is provided wherein the specific capacity is at least 110 mAh/g at 20C discharge rate. The power density (i.e., energy density per unit time) is at least 6,800 mW/g at 20C discharge rate.

In another aspect, a positive electrode material is provided wherein both the energy density and the specific capacity are optimized to achieve simultaneously a high energy density as well as a high specific capacity. In one embodiment, the energy density is at least 340 mWh/g and the specific capacity is at least 110 mAh/g at 20C discharge rate. The power density (i.e., energy density per unit time) is at least 6,800 mW/g at 20C discharge rate.

In one aspect, a positive electrode material based on lithium-iron-manganese phosphate (LFMP) having an olivine structure, which is further doped with one or more dopant elements is provided. In one embodiment, the dopant elements are doped as part of the lattice structure of the olivine structure. In certain embodiments, the dopant elements may include cobalt (Co), nickel (Ni), vanadium (V), niobium (Nb), fluorine (F), or mixtures thereof.

In one or more embodiments, a positive electrode material comprising an electroactive material is provided. The electroactive material comprises lithium (Li), iron (Fe), manganese (Mn), one or more dopants (D), and phosphate ($PO_4$), wherein the amount of Fe+Mn+D=1.0; the ratio of the amount of Li:(Fe+Mn+D) ranges from about 1.0 to about 1.05; the ratio of the amount of $PO_4$:(Fe+Mn+D) ranges from about 1.0 to about 1.025; D is one or more dopants selected from the group consisting of cobalt (Co), nickel (Ni), vanadium (V), niobium (Nb) and mixtures thereof; the amount of Mn ranges from 0.35 to 0.60; the amount of D ranges from about 0.001 to about 0.10; and the electroactive material comprises at least one phase having an olivine structure comprising at least some of said Li, Fe, Mn, D, and phosphate.

In certain embodiments, the dopants metals can be selected from a group consisting of Co, V, Nb, and mixtures thereof. In certain embodiments, the dopants metals can be selected from a mixture of Co and V.

In certain embodiment, the electroactive material can further include fluorine.

In some embodiments, the composition comprises up to about 0.1 mol %, 0.5 mol %, 1 mol %, 1.5 mol %, 2 mol %, 2.5 mol %, 3 mol %, 3.5 mol %, 4 mol %, 4.5 mol %, 5 mol %, 6 mol %, 7, mol %, 8, mol %, 9 mol %, or 10 mol % of the one or more dopant metals. In certain embodiments, the composition comprises up to 0.1 mol %, 0.5 mol %, 1 mol %, 1.5 mol %, 2 mol %, 2.5 mol %, 3 mol %, 3.5 mol %, 4 mol %, 4.5 mol %, or 5 mol % of Co. In certain embodiments, the composition comprises up to 0.1 mol %, 0.5 mol %, 1 mol %, 1.5 mol %, 2 mol %, 2.5 mol %, 3 mol %, 3.5 mol %, 4 mol %, 4.5 mol %, or 5 mol % of Ni. In certain embodiments, the composition comprises up to 0.1 mol %, 0.5 mol %, 1 mol %, 1.5 mol %, 2 mol %, 2.5 mol %, 3 mol %, 3.5 mol %, 4 mol %, 4.5 mol %, or 5 mol % of V. In certain embodiments, the composition comprises up to 0.1 mol %, 0.5 mol %, 1 mol %, 1.5 mol %, 2 mol %, 2.5 mol %, 3 mol %, 3.5 mol %, 4 mol %, 4.5 mol %, or 5 mol % of F.

In one or more embodiments, the one or more dopant metals can substitute into one or more lattice sites of the Li, Fe, or Mn of the olivine structure. In certain embodiments, F can substitute into one or more phosphate lattice sites of the olivine structure.

In one or more embodiments, the electroactive material may exist mainly as an olivinic phase. In one or more embodiments, the electroactive material may further include small amounts of dopant metal rich secondary phases.

In one or more embodiments, a positive electrode is provided that includes the positive electrode material described herein.

In one or more embodiments, a lithium secondary cell is provided that includes a positive electrode in electronic contact with a positive electrode current collector, said current collector in electrical connection with an external circuit; a negative electrode in electronic contact with a negative electrode current collector, said current collector in electrical connection with an external circuit; a separator positioned between and in ionic contact with the cathode and the anode; and an electrolyte in ionic contact with the positive and negative electrodes; where the positive electrode includes the positive electrode material described herein.

In one or more embodiments, the negative electrode of the lithium secondary cell includes a lithium intercalation compound or a lithium metal alloy. In one aspect, the negative electrode comprises carbon. In another aspect, the negative electrode comprises graphitic carbon. In yet another aspect, the carbon is selected from the group consisting of graphite, spheroidal graphite, mesocarbon microbeads and carbon fibers.

In one or more embodiments, the positive electrode further includes a binder and an electronically conductive material.

It is recognized that, although the features or embodiments of the electroactive material are described individually, the electroactive material, the positive electrode material, the positive electrode, or the lithium secondary cell can have one or more features described herein, in any combination.

BRIEF DESCRIPTION OF THE DRAWING

A more complete appreciation of the present invention and many of its advantages will be understood by reference to the following detailed description when considered in connection with the following drawings, which are presented for the purpose of illustration only are not intended to limit the scope of the appended claims, and in which:

DETAILED DESCRIPTION

Definitions

Figure 1:
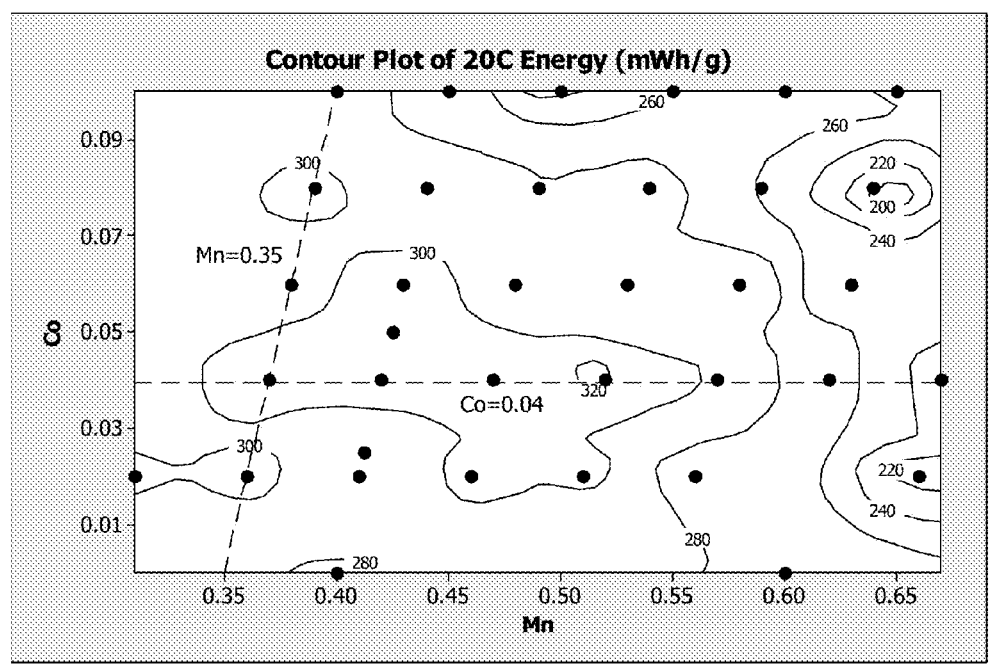
FIG. 1 is a contour plot of energy density as a function of composition of stoichiometric LFMP materials doped with Co, in which the vertical axis indicates the Co content, and the horizontal axis indicates the Mn content of the composition $LiMn_xFe_yCo_zPO_4$; and wherein the Co content (z) of a compositional point $LiMn_xFe_yCo_zPO_4$ in the contour plot is the vertical-axis-intercept of the horizontal line that passes through the point; the Mn content (x) of a composition point in the contour plot is the horizontal-axis-intercept of the line that passes through the point in parallel with the slanted dashed line (labeled as Mn=0.350) shown in the figure; and the Fe content (y) of the compositional point is determined by satisfying the equation x+y+z=1.

As used herein, a "dopant metal" refers a metal that can be doped into (or substituted for an element of) an electroactive material of a positive electrode, either into the lattice sites of the electroactive material. In certain embodiment, the dopant metal is present at a small concentration (relative to that of the electroactive metal) or has a redox potential significantly different from the electroactive metal so that the dopant metal does not significantly contribute to the electric storage capacity in an electrochemical cell.

As used herein, a "olivine structure" refers to a compound based on the chemical formula $(M1,M2)_2AO_4$. The olivinic structure is composed of isolated tetrahedral $AO_4$ anionic groups and M1 and M2 cations surrounded by six oxygen ions. Generally, the olivine structure exhibits orthorhombic 2 mmm crystal symmetry and has a plurality of planes defined by zigzag chains and linear chains. The M1 cations generally occupy the zigzag chains of octahedral sites and M2 cations generally occupy the linear chains of alternate planes of the octahedral sites. The lattices sites can be doped with other dopant metals and nevertheless maintain the olivine structure.

As used herein, a "olivinic phase" is any crystalline phase having the olivine structure. The olivinic phase can include one or more dopant metals substituted into the lattice structure of the olivine structure. For example, the olivinic phase can be based on lithium-iron-manganese-phosphate (LFMP) material having an olivine structure that is doped with one or more dopant metals in the lattice sites of the olivine structure.

As used herein, an "olivine compound" refers to a material having an olivine structure.

As used herein, a "stoichiometric olivine compound" refers to the amount of lithium and/or phosphate that is in the material relative to the other metals. For example, if the olivine compound is $LiFePO_4$, the ratio of $Li:Fe:PO_4$ is 1:1:1 to form a stoichiometric olivine compound. If the olivine compound is Li—Fe—Mn—Co—Ni—V—$PO_4$, the ratio of Li:Fe+Mn+Co+Ni+V:$PO_4$ is 1:1:1 to form a stoichiometric olivine compound.

As used herein, "excess lithium" or "lithium rich" refers to the amount of lithium in the overall composition in excess of that needed to form the stoichiometric olivine compound.

As used herein, "excess phosphate" or "phosphate-rich" refers to the amount of phosphate in the overall composition in excess of that needed to form the stoichiometric olivine compound.

As used herein, "solid solution" refers a mixture of different atomic cations and anions that have arranged themselves into a single lattice structure, such as the olivine structure. For example, olivine compounds, such as LFMP and dopant metals, existing together as an olivinic phase can be referred to as a solid solution.

As used herein, the term "specific capacity" refers to the capacity per unit mass of the electroactive material in the positive electrode and has units of milliamps-hour/gram (mAh/g).

As used herein, the term "energy density" refers the amount of energy a battery has in relation to its size. Energy density is the total amount of energy (in Wh) a battery can store per amount of the electroactive material in the positive electrode for a specified rate of discharge.

Designing and obtaining improved battery materials is an extremely difficult task. There are many different variables that must be taken into account in designing improved battery materials, such as the application in which the battery will perform, the stability/longevity of the battery, cost, and the like. Traditionally, batteries have been designed to exhibit either high energy density or high specific capacity based on the desired application. This design choice has been traditionally made due to the difficulty faced in navigating and overcoming the various design variables that exist. It should be noted that maximizing the energy density does not necessarily lead to maximizing the specific capacity and vice versa.

Despite the efforts, it has been extremely difficult to achieve battery materials that will enable high energy density and/or high specific capacity. Despite some advances, continuous improvements in energy and/or specific capacity are needed and many attempts have been made to do so. These attempts and the subsequent results generally provide very little guidance on what material combinations will achieve even further increases in the energy and specific capacity.

One general expectation is that since the redox potential of Mn in the olivine structure (about 4.0V vs. Li) is approximately 0.5V higher than that of Fe (3.5 V vs. Li), Mn-rich Li—Fe—Mn phosphate (LFMP) materials should achieve improved properties, such as energy density and specific capacity. In fact, others have focused on such Mn-rich phosphate materials. However, surprisingly and contrary to conventional wisdom, the present invention obtains improved properties, such as energy density and specific capacity, of positive electrode LFMP material having lower levels of Mn, and, for example, where the molar amount of Mn in the LFMP is less than 60%, 55%, 50%, 45%, or 40%.

Moreover, without wishing to be bound by theory, most dopant metals have stable oxidation states that may be changed only at potentials that are significantly different from the redox potentials of Fe and/or Mn. Therefore, these dopant metals are not expected to directly contribute to the electric storage capacity of the material. For example, since the redox potentials of Co and Ni are about at least 0.5V higher than that of manganese and at least 1.0V higher than that of iron, such dopant metals would not normally contribute significant electric storage capacity to a battery cell operating at or near the redox plateau for $Fe^{2+} \rightarrow Fe^{3+}$.

However, contrary to conventional wisdom, certain dopant metals may contribute to increase the energy density and/or the specific capacity of the battery.

In certain embodiments, the present invention provides doped LFMP material having at least one olivinic phase that comprises lithium (Li), iron (Fe), manganese (Mn), one or more dopants (D) and phosphate ($PO_4$), where the overall composition includes Fe+Mn+D=1.0, the ratio of the amount of Li:(Fe+Mn+D) ranges from about 1.0 to about 1.05, the ratio of the amount of $PO_4$:(Fe+Mn+D) ranges from about 1.0 to about 1.025, D is one or more metals selected from the group consisting of cobalt (Co), nickel (Ni), vanadium (V), niobium (Nb), and mixtures thereof, and Mn ranges from 0.350 to less than 0.600, or 0.400 to less than 0.600, or 0.400 to 0.550, or 0.450 to 0.550, or 0.450 to 0.500. In certain embodiments, D is one or more metals selected from the group consisting of cobalt (Co), vanadium (V), or mixtures thereof. In certain embodiments, the positive electrode material can be further doped with fluorine (F).

In some embodiments, the composition comprises up to about 0.1 mol %, 0.5 mol %, 1 mol %, 1.5 mol %, 2 mol %, 2.5 mol %, 3 mol %, 3.5 mol %, 4 mol %, 4.5 mol %, 5 mol %, 6 mol %, 7, mol %, 8, mol %, 9 mol %, or 10 mol % of the one or more dopant metals. In certain embodiments, the composition comprises up to 0.1 mol %, 0.5 mol %, 1 mol %, 1.5 mol %, 2 mol %, 2.5 mol %, 3 mol %, 3.5 mol %, 4 mol %, 4.5 mol %, or 5 mol % of Co. In certain embodiments, the composition comprises up to 0.1 mol %, 0.5 mol %, 1 mol %, 1.5 mol %, 2 mol %, 2.5 mol %, 3 mol %, 3.5 mol %, 4 mol %, 4.5 mol %, or 5 mol % of Ni. In certain embodiments, the composition comprises up to 0.1 mol %, 0.5 mol %, 1 mol %, 1.5 mol %, 2 mol %, 2.5 mol %, 3 mol %, 3.5 mol %, 4 mol %, 4.5 mol %, or 5 mol % of V. In certain embodiments, the composition comprises up to 0.1 mol %, 0.5 mol %, 1 mol %, 1.5 mol %, 2 mol %, 2.5 mol %, 3 mol %, 3.5 mol %, 4 mol %, 4.5 mol %, or 5 mol % of F.

In one or more embodiments, a positive electrode material including an electroactive material is provided. The electroactive material comprises at least an olivinic phase that comprises lithium (Li), iron (Fe), manganese (Mn), one or more dopants (D) and phosphate ($PO_4$), where the overall composition has a ratio of Li:(Fe+Mn+D) ranging from about 1.000 to about 1.050, a ratio of ($PO_4$):(Fe+Mn+D) ranging from about 1.000 to about 1.025, and D is one or more metals selected from the group consisting of cobalt (Co), nickel (Ni), vanadium (V), niobium (Nb), and mixtures thereof. In certain embodiments, D is one or more metals selected from the group consisting of cobalt (Co), vanadium (V), or mixtures thereof. In certain embodiments, the positive electrode material can be further doped with fluorine (F).

In one or more embodiments, a positive electrode material is provided including a lithium and/or phosphate stoichiometric electroactive material, having one or more phases comprising lithium (Li), iron (Fe), manganese (Mn), one or more dopants (D) and phosphate ($PO_4$), where the overall composition has a ratio of Li:(Fe+Mn+D) that is about 1.000, a ratio of ($PO_4$):(Fe+Mn+D) that is about 1.000, and D is one or more metals selected from the group consisting of cobalt (Co), nickel (Ni), vanadium (V), niobium (Nb), or mixtures thereof. In certain embodiments, D is one or more metals selected from the group consisting of cobalt (Co), vanadium (V), or mixtures thereof. In certain embodiments, D is one or more metals selected from the group consisting of cobalt (Co), vanadium (V), niobium (Nb). or mixtures thereof. Without wishing to be bound by theory, the presence of Nb may increase the electrical conductivity of the electroactive material. In certain embodiments, the positive electrode material can be further doped with fluorine (F).

In one or more embodiments, a positive electrode material including a lithium-rich and/or phosphate-rich electroactive material is provided. The electroactive material comprises at least an olivinic phase that includes lithium (Li), iron (Fe), manganese (Mn), one or more dopants (D) and phosphate ($PO_4$), where the overall composition has a ratio of Li:(Fe+Mn+D) ranging from about greater than 1.000 to about 1.050, a ratio of ($PO_4$):(Fe+Mn+D) ranging from about greater than 1.000 to about 1.025, and D is one or more metals selected from the group consisting of cobalt (Co), nickel (Ni), vanadium (V), niobium (Nb), and mixtures thereof. In certain embodiments, D is one or more metals selected from the group consisting of cobalt (Co), vanadium (V), or mixtures thereof. In certain embodiments, the positive electrode material can be further doped with fluorine (F).

The excess lithium and excess phosphate in the overall composition need not provide a non-stoichiometric olivine compound in a single olivinic structure or single olivinic phase. Rather, the excess lithium and/or phosphate may be present, for example, as secondary phases and the like in conjunction with an olivininc phase.

Typically, the dopants, such as Co, Ni, V, Nb, and/or F, are doped into and reside on the lattice sites of the olivinic structure to form an olivinic phase. However, small amounts of dopant-rich secondary phases may be tolerated before degradation of the Li-ion battery cell performance is exhibited.

Cathode electroactive materials according to one or more embodiments exhibit high energy density and/or high specific capacity at high discharge rates, such as 10 times faster than a rate corresponding to one complete discharge of the battery in 1 hour (10C—meaning a complete discharge occurs in 6 minutes or one-tenth of an hour) and 20 times faster than a rate corresponding to one complete discharge of the battery in 1 hour (20C—meaning a complete discharge occurs in 3 minutes or one-twentieth of an hour). For example, the positive electrode material achieves energy density that is at least 200 mWh/g, 250 mWh/g, 300 mWh/g, 340 mWh/g, 350 mWh/g, 360 mWh/g, or 370 mWh/g, 380 mWh/g, 390 mWh/g, or 400 mWh/g at 20C discharge rate. In another aspect, the positive electrode material is provided wherein the specific capacity is at least 90 mAh/g, or 100 mAh/g, or 110 mAh/g, or 115 mAh/g, or 120 mAh/g, or 125 mAh/g at 20C discharge rate. Specific power density is at least 6,800 mW/g, 7,000 mW/g, 7,200 mW/g, 7,400 mW/g, 7600 mW/g, 7,800 mW/g, or 8,000 mW/g at 20C discharge rate.

It should be noted that in order for a lithium secondary battery to be widely acceptable for a wide range of electric vehicle or large format energy grid applications the battery must have both high energy storage density (Wh/kg) and a useful high power density (W/kg). The power density can be simply thought of as the energy capacity of the battery system that can be used (or stored) during some unit of time. For example, in the specific materials illustrated herein, the energy density is reported (as mWh/g) where only the weight of the active cathode material is considered (and not the full battery system weight), which would include the choice of anode, current collectors, separator, electrolyte and packaging material. Further, we report the energy density at a significantly high discharge rate of 20C, (or fully discharging the energy is 1/20 of an hour, 180 seconds). By focusing on this relatively high discharge rate the reported materials can satisfy not only the energy density requirement but also the high power density applications like electrification of motor vehicles and real-time energy grid stabilization.

Some suitable exemplary compositions that may provide improved energy density and power density include, but are not limited to:

$Li_{1.025}Mn_{0.400}Fe_{0.580}Co_{0.020}(PO_4)_{1.000}$
$Li_{1.025}Mn_{0.450}Fe_{0.530}Co_{0.020}(PO_4)_{1.000}$
$Li_{1.025}Mn_{0.500}Fe_{0.480}Co_{0.010}Ni_{0.010}(PO_4)_{1.000}$
$Li_{1.050}Mn_{0.450}Fe_{0.500}Co_{0.010}Ni_{0.010}V_{0.030}(PO_4)_{1.025}$
$Li_{1.040}Mn_{0.400}Fe_{0.560}Co_{0.010}Ni_{0.010}V_{0.020}(PO_4)_{1.015}$
$Li_{1.040}Mn_{0.450}Fe_{0.510}Co_{0.010}Ni_{0.010}V_{0.020}(PO_4)_{1.015}$
$Li_{1.030}Mn_{0.450}Fe_{0.520}Co_{0.010}Ni_{0.010}V_{0.010}(PO_4)_{1.005}$
$Li_{1.040}Mn_{0.450}Fe_{0.510}Co_{0.010}Ni_{0.010}V_{0.030}(PO_4)_{1.010}$
$F_{0.015}$
$Li_{1.050}Mn_{0.450}Fe_{0.510}Co_{0.0010}Ni_{0.005}V_{0.020}(PO_4)_{1.020}$
$Li_{1.000}Mn_{0.500}Fe_{0.460}Co_{0.040}PO_4$
$Li_{1.000}Mn_{0.450}Fe_{0.530}Co_{0.010}Ni_{0.010}PO_4$
$Li_{1.025}Mn_{0.500}Fe_{0.480}Co_{0.010}Nb_{0.010}(PO_4)_{1.000}$
$Li_{1.050}Mn_{0.450}Fe_{0.500}Co_{0.010}Nb_{0.010}V_{0.030}(PO_4)_{1.025}$
$Li_{1.040}Mn_{0.400}Fe_{0.560}Co_{0.010}Nb_{0.010}V_{0.020}(PO_4)_{1.015}$
$Li_{1.040}Mn_{0.450}Fe_{0.510}Co_{0.010}Nb_{0.010}V_{0.020}(PO_4)_{1.015}$
$Li_{1.030}Mn_{0.450}Fe_{0.520}Co_{0.010}Nb_{0.010}V_{0.010}(PO_4)_{1.005}$
$Li_{1.040}Mn_{0.450}Fe_{0.510}Co_{0.010}Nb_{0.010}V_{0.030}(PO_4)_{1.010}$
$F_{0.015}$, or
$Li_{1.050}Mn_{0.450}Fe_{0.510}Co_{0.0100}Nb_{0.005}V_{0.025}(PO_4)_{1.020}$.

Additionally, control of the primary olivine crystallite size to <100 nm dimensions may be beneficial in enhancing both lithium transport kinetics and conductivity of the LFMP materials of the present invention. Further details regarding the composition and preparation of such analogous compounds (lithium-iron phosphate materials) are found in United States Published Application 2004/0005265, now U.S. Pat. No. 7,338,734, which is incorporated herein in its entirety by reference.

Doping with hypervalent transition metals such as Nb or V may further contribute to the advantageous application of the resulting olivine materials for rechargeable lithium ion battery applications. The advantageous role of the dopant may be several fold and include the increased electronic conductivity of the olivine powder and may limit the sintering of the olivine nanophosphate particles to allow full utilization of the lithium capacity during fast charge/discharge of the battery.

The positive electroactive material can be prepared in a number of different ways. Generally, the process involves preparing a mixture of starting materials containing lithium, iron, manganese, and cobalt sources along with additional dopant metal sources. Exemplary lithium sources include lithium carbonate and lithium dihydrogen phosphate. Exemplary iron sources include iron phosphate, iron oxalate, iron carbonate, and the like. Exemplary manganese sources include manganese carbonate, manganese phosphate. Exemplary dopant metal sources include cobalt oxalate, nickel oxalate, vanadium oxide, ammounium metavanaate, ammonia fluoride, and the like. The starting materials can optionally be in the hydrated form or utilized as dried powder mixtures. The starting materials can optionally further include other components, such as ammonium phosphate, water soluble polymers (e.g., water soluble vinyl based copolymers), or other precursors (e.g., sugar precursors).

In certain embodiments, the positive electroactive material including a doped olivine electroactive compound can be prepared from starting materials of lithium salts, iron compounds and phosphorous salts including, but not limited to, lithium carbonate, iron oxalate or carbonate, manganese carbonate, and ammonium phosphate to which a low additional concentration of dopant metal such as Co, Ni, V, and/or F have been added, such as using cobalt oxalate, nickel oxalate, vanadium oxide, and/or ammonia fluoride. The dried powder mixture is heated under a low oxygen, e.g., inert, environment at a temperature of 300° C. to 900° C., and for example at a temperature of about 600-700° C. Further details regarding the composition and preparation of these compounds are found in United States Published Application 2004/0005265, US 2009/01238134, and US 2009/0186277, all of which are incorporated by reference herein in their entirety.

In other embodiments, a process for the synthesis of a lithium electroactive metal phosphate includes the milling and heating a mixture of materials including a lithium source, an iron phosphate and one or more additional dopant metal sources under a reducing atmosphere. Exemplary starting materials include, but are not limited to, lithium carbonate, ferric phosphate, and vanadium oxide. The mixtures are heated at atmospheric pressures under a reducing atmosphere to temperatures of approximately 550-700° C., followed by cooling to room temperature, typically under inert atmospheres. Further details regarding the composition and preparation of these compounds are found in U.S. Pat. No. 7,282,301, which is incorporated herein in its entirety by reference.

In other embodiments, a process for the synthesis of a lithium electroactive metal phosphate includes the a water-based milling process, wherein starting materials, such as lithium carbonate, hydrated iron phosphate, hydrated manganese phosphate, lithium dihydrogen phosphate, hydrated cobalt oxalate, hydrated nickel oxalate, and ammonium metavanadate are mixed with water soluble vinyl based copolymers or sugar precurors for milling and subsequent drying. After drying, the power can be heated under desired temperature ramp-up conditions up to about 700° C., followed by cooling to room temperature.

The positive electrode (cathode) is manufactured by applying a semi-liquid paste containing the cathode active compound and conductive additive homogeneously dispersed in a solution of a polymer binder in an appropriate casting solvent to both sides of a current collector foil or grid and drying the applied positive electrode composition. A metallic substrate such as aluminum foil or expanded metal grid is used as the current collector. To improve the adhesion of the active layer to the current collector, an adhesion layer, e.g., thin carbon polymer intercoating, may be applied. The dried layers are calendared to provide layers of uniform thickness and density. The binder used in the electrode may be any suitable binder used as binders for non-aqueous electrolyte cells.

In assembling a lithium ion cell, the negative electrode active material can be any material capable of reversibly taking up lithium. In one embodiment, the negative active material is a carbonaceous material. The carbonaceous material may be non-graphitic or graphitic. A small-particle-size, graphitized natural or synthetic carbon can serve as the negative active material. Although non-graphitic carbon materials or graphite carbon materials may be employed, graphitic materials, such as natural graphite, spheroidal natural graphite, mesocarbon microbeads and carbon fibers, such as mesophase carbon fibers, are preferably used.

A nonaqueous electrolyte is used and includes an appropriate lithium salt dissolved in a nonaqueous solvent. The electrolyte may be infused into a porous separator that spaces apart the positive and negative electrodes. In one or more embodiments, a microporous electronically insulating separator is used.

The positive electrode active material can be incorporated into any battery shape. In fact, various different shapes and sizes, such as cylindrical (jelly roll), square, rectangular (prismatic) coin, button or the like may be used.

Example 1

Stoichiometric LFMP Material Doped with Cobalt

To prepare $LiMn_xFe_yCo_zPO_4$ (x+y+z=1), lithium carbonate, manganese carbonate, iron oxalate, cobalt oxalate, and ammonium dihydrogen phosphate were mixed in a plastic milling jar containing zirconia grinding media and acetone for three days, and then dried using a rotary evaporator.

Various samples were prepared where the relative amounts of Mn, Fe, and Co were varied as follows: $0.300 \leq x \leq 0.650$, $0.300 \leq y \leq 0.680$, and $0 \leq z \leq 0.100$. Amounts of raw materials were determined to provide the target molar % of each metal in the final product based on the metal assay by ICP-AES (inductively coupled plasma-atomic emission spectroscopy).

For example, to synthesize $LiMn_{0.500}Fe_{0.460}Co_{0.040}PO_4$, 7.463 g of lithium carbonate, 12.048 g of manganese carbonate, 16.901 g of iron oxalate, 1.451 g of cobalt oxalate, and 22.775 g of ammonium dihydrogen phosphate were mixed in a plastic milling jar containing 1000 g of zirconia grinding medial and 400 ml of acetone.

The dried powder was heated in a tube furnace in nitrogen. The heating profile was ramp from 25° C. to 350° C. in 5 hr, followed by hold at 350° C. for 5 hr, followed by ramp from 350° C. to 700° C. in 1 hr, followed by hold at 700° C. for 5 hr, followed by cooling down to 25° C. The finished product was milled and then stored in the absence of water.

The positive electrode slurry was prepared by dissolving 0.0225 g of PVDF-HFP copolymer commercially available as Kynar® 2801 in 1.496 g of acetone and dispersing in the resulting solution a dry mixture of 0.1612 g of $LiMn_xFe_yCo_zPO_4$ (x+y+z=1) prepared as described above and 0.0204 g of conductive carbon (Super P). The paste is homogenized in a vial using a Wig-L-Bug cast on one side of an aluminum foil current collector using a die casting apparatus, dried at room temperature to remove the casting solvent, and then densified using a calendaring apparatus.

The positive electrode and lithium foil as the negative electrode were cut to proper dimensions and interposed with a glass fiber separator (from Whatman) to form a Swagelok type half cell against lithium foil. First charge capacities (FCC's) along with capacity and energy were measured at the rates: C/5, C/2, 1C, 2C, 5C, 10C, 20C, 35C and 50C.

The results of the various measurements are shown in Table 1 below:

TABLE 1

| Sample ID | Composition | 10 C Discharge Energy (mWh/g) | 20 C Discharge Energy (mWh/g) |
|---|---|---|---|
| 28-3-44A | $LiMn_{0.300}Fe_{0.680}Co_{0.020}PO_4$ | 365.2 | 301.2 |
| 28-3-44B | $LiMn_{0.350}Fe_{0.630}Co_{0.020}PO_4$ | 370.2 | 304.1 |
| 28-3-41A | $LiMn_{0.350}Fe_{0.610}Co_{0.040}PO_4$ | 372.4 | 305.5 |
| 28-3-33A | $LiMn_{0.350}Fe_{0.590}Co_{0.060}PO_4$ | 369.2 | 296.2 |
| 28-3-50A | $LiMn_{0.350}Fe_{0.570}Co_{0.080}PO_4$ | 378.7 | 309.4 |
| 28-3-35A | $LiMn_{0.350}Fe_{0.550}Co_{0.100}PO_4$ | 353.7 | 291.6 |
| 28-3-15C | $LiMn_{0.400}Fe_{0.600}PO_4$ | 339.5 | 272.8 |
| 28-3-63A | $LiMn_{0.400}Fe_{0.580}Co_{0.020}PO_4$ | 374.6 | 302.8 |
| 28-3-16F | $LiMn_{0.400}Fe_{0.575}Co_{0.025}PO_4$ | 344.8 | 281.8 |
| 28-3-63B | $LiMn_{0.400}Fe_{0.560}Co_{0.040}PO_4$ | 369.8 | 305.5 |
| 28-3-16C | $LiMn_{0.400}Fe_{0.550}Co_{0.050}PO_4$ | 375.8 | 315.3 |
| 28-3-30A | $LiMn_{0.400}Fe_{0.540}Co_{0.060}PO_4$ | 383.4 | 311.6 |
| 28-3-50B | $LiMn_{0.400}Fe_{0.520}Co_{0.080}PO_4$ | 369.6 | 291.5 |
| 28-3-35B | $LiMn_{0.400}Fe_{0.500}Co_{0.100}PO_4$ | 332.3 | 263.4 |
| 28-3-44C | $LiMn_{0.450}Fe_{0.530}Co_{0.020}PO_4$ | 368.3 | 306.0 |

TABLE 1-continued

| Sample ID | Composition | 10 C Discharge Energy (mWh/g) | 20 C Discharge Energy (mWh/g) |
|---|---|---|---|
| 28-3-41B | $LiMn_{0.450}Fe_{0.510}Co_{0.040}PO_4$ | 383.8 | 318.4 |
| 28-3-33B | $LiMn_{0.450}Fe_{0.490}Co_{0.060}PO_4$ | 366.8 | 294.5 |
| 28-3-50C | $LiMn_{0.450}Fe_{0.470}Co_{0.080}PO_4$ | 360.1 | 281.5 |
| 28-3-35C | $LiMn_{0.450}Fe_{0.450}Co_{0.100}PO_4$ | 294.0 | 225.5 |
| 28-3-44D | $LiMn_{0.500}Fe_{0.480}Co_{0.020}PO_4$ | 382.2 | 306.2 |
| 28-3-41C | $LiMn_{0.500}Fe_{0.460}Co_{0.040}PO_4$ | 387.9 | 333.5 |
| 28-3-30B | $LiMn_{0.500}Fe_{0.440}Co_{0.060}PO_4$ | 362.6 | 279.8 |
| 28-3-50D | $LiMn_{0.500}Fe_{0.420}Co_{0.080}PO_4$ | 370.3 | 293.1 |
| 28-3-35D | $LiMn_{0.500}Fe_{0.400}Co_{0.100}PO_4$ | 328.9 | 258.0 |
| 28-3-44E | $LiMn_{0.500}Fe_{0.430}Co_{0.020}PO_4$ | 348.3 | 265.6 |
| 28-3-41D | $LiMn_{0.500}Fe_{0.410}Co_{0.040}PO_4$ | 370.9 | 301.3 |
| 28-3-33C | $LiMn_{0.500}Fe_{0.390}Co_{0.060}PO_4$ | 377.8 | 302.8 |
| 28-3-50E | $LiMn_{0.500}Fe_{0.370}Co_{0.080}PO_4$ | 333.6 | 256.6 |
| 28-3-35E | $LiMn_{0.500}Fe_{0.350}Co_{0.100}PO_4$ | 341.9 | 279.4 |
| 28-3-18D | $LiMn_{0.600}Fe_{0.400}PO_4$ | 348.7 | 278.7 |
| 28-3-41E | $LiMn_{0.600}Fe_{0.360}Co_{0.040}PO_4$ | 347.1 | 269.4 |
| 28-3-30C | $LiMn_{0.600}Fe_{0.340}Co_{0.060}PO_4$ | 321.8 | 227.8 |
| 28-3-50F | $LiMn_{0.600}Fe_{0.320}Co_{0.080}PO_4$ | 264.6 | 185.8 |
| 28-3-35F | $LiMn_{0.600}Fe_{0.300}Co_{0.100}PO_4$ | 323.8 | 257.8 |
| 28-3-44F | $LiMn_{0.650}Fe_{0.330}Co_{0.020}PO_4$ | 272.9 | 204.4 |
| 28-3-41F | $LiMn_{0.650}Fe_{0.310}Co_{0.040}PO_4$ | 299.7 | 213.3 |

FIG. 1 is the contour plot of specific energies of $LiMn_xFe_yCo_zPO_4$ (x+y+z=1) with various compositions at 20C rate for cells having the $LiMn_xFe_yCo_zPO_4$ (x+y+z=1) active materials as positive electrode and lithium foil as negative electrode. The boundary conditions of the contour plot are $0.300 \leq x \leq 0.650$, $0.300 \leq y \leq 0.680$, and $0 \leq z \leq 0.100$. In the contour plot, compositions with the same Co content (z) are located on a line that is parallel to the horizontal axis. The z value is indicated by the intercept of the line on the vertical axis. For example, all of the compositions present on the horizontal dashed line in FIG. 1 have the same Co content (z=0.04). Compositions with the same Mn content (x) are located on a line that is slanted to the horizontal axis. The x value is indicated by the intercept of the line on the horizontal axis. For example, all of the compositions present on the slanted dashed line in FIG. 1 have the same Mn content (x=0.350).

The Co content (z) of a compositional point in the contour plot is the vertical-axis-intercept of the horizontal line that passes through the point. The Mn content (x) of a composition point in the contour plot is the horizontal-axis-intercept of the line that passes through the point in parallel with the slanted dashed line (labeled as Mn=0.350) shown in FIG. 1. The Fe content (y) of the compositional point is determined when the Co and Mn contents are determined from the equation x+y+z=1.

It should be noted that the $LiMn_{0.500}Fe_{0.460}Co_{0.040}PO_4$ composition shows the highest specific energy (334 mWh/g) at discharge rate of 20C.

Example 2

Stoichiometric LFMP Material Doped with Cobalt Nickel

To prepare $LiMn_xFe_yCo_{z/2}Ni_{z/2}PO_4$ (x+y+z=1), where $0.300 \leq x \leq 0.650$, $0.300 \leq y \leq 0.630$, and $0 \leq z \leq 0.120$, lithium carbonate, manganese carbonate, iron oxalate, cobalt oxalate, nickel oxalate, and ammonium dihydrogen phosphate were mixed in a plastic milling jar containing zirconia grinding media and acetone for three days, and then dried using a rotary evaporator.

Amounts of raw materials were determined to provide the target molar % of each metal in the final product based on the metal assay by ICP-AES (inductively coupled plasma-atomic emission spectroscopy). For example, to synthesize $LiMn_{0.450}Fe_{0.530}Co_{0.010}Ni_{0.010}PO_4$, 7.463 g of lithium carbonate, 10.843 g of manganese carbonate, 19.473 g of iron oxalate, 0.363 g of cobalt oxalate, 0.425 g of nickel oxalate, and 22.775 g of ammonium dihydrogen phosphate were mixed in a plastic milling jar containing 1000 g of zirconia grinding medial and 400 ml of acetone.

The dried powder was heated in a tube furnace in nitrogen. The heating profile was ramp from 25° C. to 350° C. in 5 hr, followed by hold at 350° C. for 5 hr, followed by ramp from 350° C. to 700° C. in 1 hr, followed by hold at 700° C. for 5 hr, followed by cooling down to 25° C. The finished product was milled and then stored in the absence of water.

The positive electrode slurry was prepared by dissolving 0.0225 g of PVDF-HFP copolymer commercially available as Kynar® 2801 in 1.496 g of acetone and dispersing in the resulting solution a dry mixture of 0.1612 g of $LiMn_xFe_yCo_{z/2}Ni_{z/2}PO_4$ (x+y+z=1) prepared as described above and 0.0204 g of conductive carbon (Super P). The paste is homogenized in a vial using a Wig-L-Bug cast on one side of an aluminum foil current collector using a die casting apparatus, dried at room temperature to remove the casting solvent, and then densified using a calendaring apparatus.

The positive electrode and lithium foil as the negative electrode were cut to proper dimensions and interposed with a glass fiber separator (from Whatman) to form a Swagelok type half cell against lithium foil. First charge capacities (FCC's) along with capacity and energy were measured at the rates: C/5, C/2, 1C, 2C, 5C, 10C, 20C, 35C and 50C.

The results of the various measurements are shown in Table 2 below:

TABLE 2

| Sample ID | Composition | 10 C Discharge Energy (mWh/g) | 20 C Discharge Energy (mWh/g) |
|---|---|---|---|
| 28-3-46A | $LiMn_{0.300}Fe_{0.620}Co_{0.040}Ni_{0.040}PO_4$ | 338.3 | 271.4 |
| 28-3-37A | $LiMn_{0.300}Fe_{0.600}Co_{0.050}Ni_{0.050}PO_4$ | 348.7 | 272.8 |
| 28-3-42A | $LiMn_{0.350}Fe_{0.630}Co_{0.010}Ni_{0.010}PO_4$ | 365.1 | 295.0 |
| 28-3-39A | $LiMn_{0.350}Fe_{0.610}Co_{0.020}Ni_{0.020}PO_4$ | 352.9 | 274.7 |
| 28-3-29A | $LiMn_{0.350}Fe_{0.590}Co_{0.030}Ni_{0.030}PO_4$ | 362.3 | 298.1 |
| 28-3-46B | $LiMn_{0.350}Fe_{0.570}Co_{0.040}Ni_{0.040}PO_4$ | 336.7 | 278.2 |
| 28-3-37B | $LiMn_{0.350}Fe_{0.550}Co_{0.050}Ni_{0.050}PO_4$ | 336.7 | 270.9 |
| 28-3-15C | $LiMn_{0.400}Fe_{0.600}PO_4$ | 339.5 | 272.8 |
| 28-3-31A | $LiMn_{0.400}Fe_{0.580}Co_{0.010}Ni_{0.010}PO_4$ | 371.0 | 308.6 |
| 28-3-31B | $LiMn_{0.400}Fe_{0.560}Co_{0.020}Ni_{0.020}PO_4$ | 354.2 | 287.1 |
| 28-3-31C | $LiMn_{0.400}Fe_{0.540}Co_{0.030}Ni_{0.030}PO_4$ | 364.9 | 306.5 |
| 28-3-31D | $LiMn_{0.400}Fe_{0.520}Co_{0.040}Ni_{0.040}PO_4$ | 361.0 | 300.9 |
| 28-3-31E | $LiMn_{0.400}Fe_{0.500}Co_{0.050}Ni_{0.050}PO_4$ | 346.1 | 284.9 |
| 28-3-31F | $LiMn_{0.400}Fe_{0.480}Co_{0.060}Ni_{0.060}PO_4$ | 330.2 | 260.9 |
| 28-3-42B | $LiMn_{0.450}Fe_{0.530}Co_{0.010}Ni_{0.010}PO_4$ | 377.4 | 318.1 |
| 28-3-39B | $LiMn_{0.450}Fe_{0.510}Co_{0.020}Ni_{0.020}PO_4$ | 354.5 | 278.6 |
| 28-3-29C | $LiMn_{0.450}Fe_{0.490}Co_{0.030}Ni_{0.030}PO_4$ | 380.5 | 308.6 |
| 28-3-46C | $LiMn_{0.450}Fe_{0.470}Co_{0.040}Ni_{0.040}PO_4$ | 338.0 | 284.8 |
| 28-3-37C | $LiMn_{0.450}Fe_{0.450}Co_{0.050}Ni_{0.050}PO_4$ | 326.0 | 254.1 |
| 28-3-42C | $LiMn_{0.500}Fe_{0.480}Co_{0.010}Ni_{0.010}PO_4$ | 358.9 | 295.5 |
| 28-3-39C | $LiMn_{0.500}Fe_{0.460}Co_{0.020}Ni_{0.020}PO_4$ | 353.4 | 282.2 |
| 28-3-29D | $LiMn_{0.500}Fe_{0.440}Co_{0.030}Ni_{0.030}PO_4$ | 374.7 | 316.9 |
| 28-3-46D | $LiMn_{0.500}Fe_{0.420}Co_{0.040}Ni_{0.040}PO_4$ | 350.2 | 281.8 |
| 28-3-37D | $LiMn_{0.500}Fe_{0.400}Co_{0.050}Ni_{0.050}PO_4$ | 349.2 | 282.4 |
| 28-3-42D | $LiMn_{0.550}Fe_{0.430}Co_{0.010}Ni_{0.010}PO_4$ | 379.5 | 311.3 |
| 28-3-39D | $LiMn_{0.550}Fe_{0.410}Co_{0.020}Ni_{0.020}PO_4$ | 358.3 | 285.9 |
| 28-3-29E | $LiMn_{0.550}Fe_{0.390}Co_{0.030}Ni_{0.030}PO_4$ | 368.7 | 285.6 |
| 28-3-46E | $LiMn_{0.550}Fe_{0.370}Co_{0.040}Ni_{0.040}PO_4$ | 329.7 | 264.0 |
| 28-3-37E | $LiMn_{0.550}Fe_{0.350}Co_{0.050}Ni_{0.050}PO_4$ | 320.1 | 253.7 |
| 28-3-18D | $LiMn_{0.600}Fe_{0.400}PO_4$ | 348.7 | 278.7 |
| 28-3-42E | $LiMn_{0.600}Fe_{0.380}Co_{0.010}Ni_{0.010}PO_4$ | 367.7 | 296.5 |

TABLE 2-continued

| Sample ID | Composition | 10 C Discharge Energy (mWh/g) | 20 C Discharge Energy (mWh/g) |
|---|---|---|---|
| 28-3-39E | $LiMn_{0.600}Fe_{0.360}Co_{0.020}Ni_{0.020}PO_4$ | 357.7 | 280.7 |
| 28-3-29F | $LiMn_{0.600}Fe_{0.340}Co_{0.030}Ni_{0.030}PO_4$ | 371.6 | 293.6 |
| 28-3-46F | $LiMn_{0.600}Fe_{0.320}Co_{0.040}Ni_{0.040}PO_4$ | 307.7 | 232.8 |
| 28-3-37F | $LiMn_{0.600}Fe_{0.300}Co_{0.050}Ni_{0.050}PO_4$ | 314.0 | 242.8 |
| 28-3-42F | $LiMn_{0.650}Fe_{0.330}Co_{0.010}Ni_{0.010}PO_4$ | 346.2 | 278.1 |
| 28-3-39F | $LiMn_{0.650}Fe_{0.310}Co_{0.020}Ni_{0.020}PO_4$ | 302.3 | 209.7 |

Figure 2:
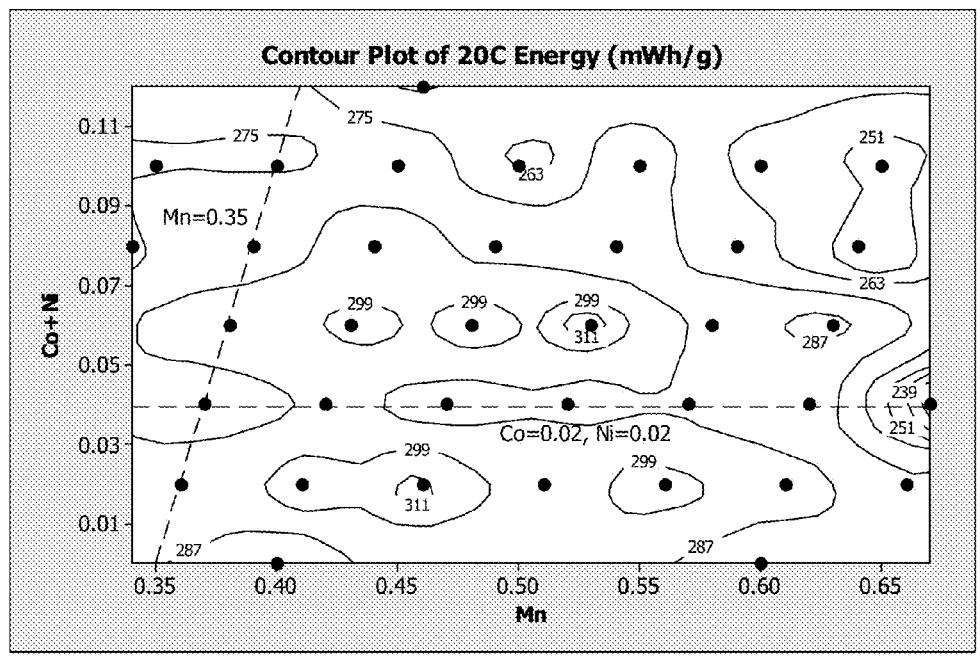
FIG. 2 is a contour plot of energy density as a function of composition of stoichiometric LFMP materials doped with Co and Ni, in which the vertical axis indicates the Co plus Ni content, and the horizontal axis indicates the Mn content of the composition $LiMn_xFe_yCo_{z/2}Ni_{z/2}PO_4$; and wherein the Co plus Ni content (z) of a compositional point $LiMn_xFe_yCo_{z/2}Ni_{z/2}PO_4$ in the contour plot is the vertical-axis-intercept of the horizontal line that passes through the point; the Mn content (x) of a compositional point in the contour plot is the horizontal-axis-intercept of the line that passes through the point in parallel with the slanted dashed line (labeled as Mn=0.350) shown in the figure; and the Fe content (y) of the compositional point is determined by satisfying the equation x+y+z=1.

FIG. 2 is the contour plot of specific energies of $LiMn_xFe_yCo_{z/2}Ni_{z/2}PO_4$ ($x+y+z=1$) with various compositions at 20C rate for cells having the $LiMn_xFe_yCo_{z/2}Ni_{z/2}PO_4$ ($x+y+z=1$) active materials as positive electrode and lithium foil as negative electrode. The boundary conditions of the contour plot are $0.300 \le x \le 0.650$, $0.300 \le y \le 0.630$, and $0 \le z \le 0.120$. The cobalt content and nickels content are the same, each indicated by $z/2$. In the contour plot, compositions with the same "Co plus Ni" contents (z) are located on a line that is parallel to the horizontal axis. The z value is indicated by the intercept of the line on the vertical axis. For example, all of the compositions present on the horizontal dashed line in FIG. 2 have the same "Co plus Ni" content ($z=0.040$), and Co and Ni contents are each 0.020. Compositions with the same Mn content (x) are located on a line that is slanted to the horizontal axis. The x value is indicated by the intercept of the line on the horizontal axis. For example, all of the compositions present on the slanted dashed line in FIG. 2 have the same Mn content ($x=0.350$).

The "Co plus Ni" content (z) of a compositional point in the contour plot is the vertical-axis-intercept of the horizontal line that passes through the point. The Mn content (x) of a compositional point in the contour plot is the horizontal-axis-intercept of the line that passes through the point in parallel with the slanted dashed line (labeled as Mn=0.350) shown in FIG. 2. The Fe content (y) of the compositional point is determined when the "Co plus Ni" and Mn contents are determined from the equation $x+y+z=1$.

It should be noted that the composition of $LiMn_{0.450}Fe_{0.530}Co_{0.010}Ni_{0.010}PO_4$ shows the highest specific energy (318 mWh/g) at discharge rate of 20C.

Example 3

Non-Stoichiometric LFMP Material Doped with Cobalt

Additional improvements were observed when lithium-rich LFMP material doped with cobalt were formulated. In this study, 2.5 mol % excess Li was used and the amounts of Mn, Fe, and Co were varied, as represented by $Li_{1.025}Mn_xFe_yCo_zPO_4$, where $0.35 \le x \le 0.65$, $x+y+z=1$, and $0.00 \le z \le 0.08$.

To prepare the Co-doped LFMP, $Li_2CO_3$, $FePO_4 \cdot xH_2O$, $Mn_3(PO_4)_2 \cdot H_2O$, $LiH_2PO_4$, $CoC_2O_4 \cdot 2H_2O$ and alcohol soluble vinyl based copolymer precursors were mixed in a plastic milling jar containing YTZ zirconia grinding media and IPA for three days and then dried using a rotary evaporator. Materials are selected to provide the target molar % of each metal in the final product based on the metal assay in Certificate of Analysis provided by the manufacturer.

For example, to prepare 0.1M (≈16 g) $Li_{1.025}Mn_{0.450}Fe_{0.530}Co_{0.020}PO_4$, 3.265 g $Li_2CO_3$, 10.242 g $FePO_4 \cdot xH_2O$, 6.267 g $Mn_3(PO_4)_2 \cdot xH_2O$, 1.576 g $LiH_2PO_4$, 0.366 g $CoC_2O_4 \cdot 2H_2O$ and 0.947 g alcohol soluble vinyl based copolymer were used.

The dried powder was heated with a TPR (temperature programmed reaction) process in a tube furnace under an inert atmosphere. The heating profile was ramp from 25° C. to 350° C. in 0.5 hr, followed by hold at 350° C. for 0.5 hr, followed by ramp from 350° C. to 700° C. in 0.5 hr, followed by hold at 700° C. for 1 hr, followed by cooling down to 25° C. The finished product was milled and then stored in the absence of water.

The positive electrode slurry was prepared by dissolving 0.0225 g of PVDF-HFP copolymer commercially available as Kynar® 2801 from AtoFina in 1.496 g of acetone and dispersing in the resulting solution a dry mixture of 0.1612 g of doped LFMP prepared as described above and 0.0204 g of conductive carbon (Super P or Ensaco). The paste is homogenized in a vial using a Wig-L-Bug cast on one side of an aluminum foil current collector using a die casting apparatus, dried in an oven to remove the casting solvent and densified using a calendaring apparatus.

The positive electrode and lithium foil as the negative electrode were cut to proper dimensions and interposed with a glass fiber separator to form a Swagelok type half cell against lithium foil. First charge capacities (FCC's) along with capacity and energy were measured at the rates: C/5, C/2, 1C, 2C, 5C, 10C, 20C, 30C and 50C.

The results of the various measurements are shown in Table 3 below:

TABLE 3

| Mat. # | Dopant | 10 C Disch. Cap./ mAh/g | 10 C Disch. Ener./ mWh/g | 20 C Disch. Cap./ mAh/g | 20 C Disch. Ener./ mWh/g | C/% |
|---|---|---|---|---|---|---|
| CX8-077 | Co0.040 Mn0.350 Fe0.610 | 127.7 | 420.0 | 121.3 | 378.3 | 2.39 |
| CX8-066 | Co0.040 Mn0.400 Fe0.560 | 122.7 | 395.3 | 114.0 | 343.7 | 2.60 |
| CX8-067 | Co0.040 Mn0.450 Fe0.510 | 125.7 | 415.0 | 117.7 | 367.0 | 2.74 |
| CX8-068 | Co0.040 Mn0.500 Fe0.460 | 121.3 | 398.7 | 113.0 | 347.3 | 2.63 |
| CX8-100 | Co0.040 Mn0.550 Fe0.410 | 112.0 | 364.3 | 101.0 | 305.3 | 2.47 |
| CX8-76 | Co0.040 Mn0.600 Fe0.360 | 114.0 | 375.3 | 103.7 | 313.7 | 2.41 |
| CX8-078 | Co0.020 Mn0.500 Fe0.480 | 123.3 | 409.0 | 116.3 | 361.7 | 2.46 |
| CX8-079 | Co0.080 Mn0.500 Fe0.420 | 102.0 | 323.7 | 90.3 | 264.3 | 2.49 |
| CX8-107 | Co0.020 Mn0.450 Fe0.530 | 126.3 | 417.3 | 119.7 | 376.3 | 2.64 |
| CX8-108 | Co0.030 Mn0.450 Fe0.520 | 123.7 | 400.7 | 108.3 | 323.0 | 2.47 |
| CX8-124 | Co0.020 Mn0.400 Fe0.580 | 129.3 | 425.3 | 122.3 | 381.7 | 2.66 |

Figure 3:
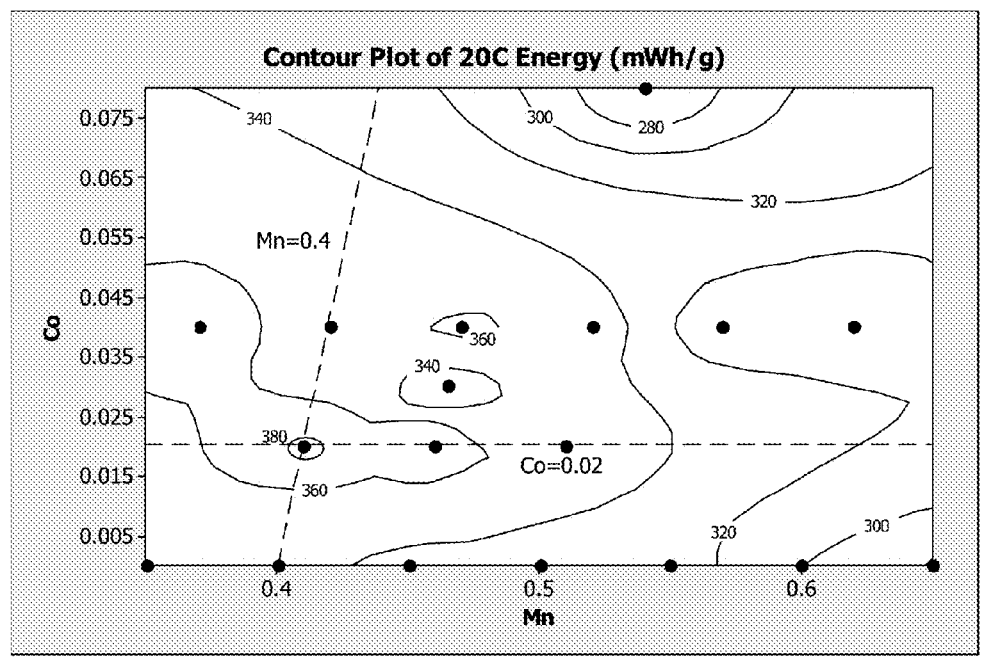
FIG. 3 is a contour plot of energy density as a function of Co dopant content and Mn content in a non-stoichiometric LFMP material doped with Co.

FIG. 3 is a plot of 20C discharge energy vs. Mn content and dopant (Co) content for cells including the various samples of Example 3 as positive electrode and lithium foil as negative electrode.

It should be noted that the highest 20C energy performance compositions from FIG. 3 is $Li_{1.025}Mn_{0.400}Fe_{0.580}Co_{0.020}PO_4$ (382 mWh/g).

Example 4

Non-Stoichiometric LFMP Material Doped with Cobalt and Nickel

Additional improvements were observed when lithium-rich LFMP material doped with cobalt and nickel were formulated. In this study, 2.5 mol % excess Li was used and the amounts of Mn, Fe, Co, and Ni were varied, as represented by $Li_{1.025}Mn_xFe_yCo_zNi_zPO_4$, where $0.350 \leq x \leq 0.650$, $x+y+2z=1$, and $0.00 \leq z \leq 0.035$.

To prepare Co and Ni doped LMFP, $Li_2CO_3$, $FePO_4 \cdot xH_2O$, $Mn_3(PO_4)_2 \cdot H_2O$, $LiH_2PO_4$, $CoC_2O_4 \cdot 2H_2O$, $NiC_2O_4 \cdot 2H_2O$ and alcohol soluble vinyl based copolymer precursors were mixed in a plastic milling jar containing YTZ zirconia grinding media and IPA for three days and then dried using a rotary evaporator. Materials are selected to provide the target molar % of each metal in the final product based on the metal assay in Certificate of Analysis provided by the manufacturer.

For example, to prepare 0.1M (≈16 g) $Li_{1.025}Mn_{0.500}Fe_{0.480}Co_{0.010}Ni_{0.010}PO_4$, 3.195 g $Li_2CO_3$, 9.276 g $FePO_4 \cdot xH_2O$, 6.963 g $Mn_3(PO_4)_2 \cdot xH_2O$, 1.774 g $LiH_2PO_4$, 0.183 g $CoC_2O_4 \cdot 2H_2O$, 0.183 g $NiC_2O_4 \cdot 2H_2O$ and 0.947 g alcohol soluble vinyl based copolymer were used.

The dried powder was heated with a TPR (temperature programmed reaction) process in a tube furnace under an inert atmosphere. The heating profile was ramp from 25° C. to 350° C. in 0.5 hr, followed by hold at 350° C. for 0.5 hr, followed by ramp from 350° C. to 700° C. in 0.5 hr, followed by hold at 700° C. for 1 hr, followed by cooling down to 25° C. The finished product was milled and then stored in the absence of water.

The positive electrode slurry was prepared by dissolving 0.0225 g of PVDF-HFP copolymer commercially available as Kynar® 2801 from AtoFina in 1.496 g of acetone and dispersing in the resulting solution a dry mixture of 0.1612 g of doped LFMP prepared as described above and 0.0204 g of conductive carbon (Super P or Ensaco). The paste is homogenized in a vial using a Wig-L-Bug cast on one side of an aluminum foil current collector using a die casting apparatus, dried in an oven to remove the casting solvent and densified using a calendaring apparatus.

The positive electrode and lithium foil as the negative electrode were cut to proper dimensions and interposed with a glass fiber separator to form a Swagelok type half cell against lithium foil. First charge capacities (FCC's) along with capacity and energy were measured at the rates: C/5, C/2, 1C, 2C, 5C, 10C, 20C, 30C and 50C.

The results of the various measurements are shown in Table 4 below:

TABLE 4

| Mat. # | Dopant | 10 C Disch. Cap./ mAh/g | 10 C Disch. Ener./ mWh/g | 20 C Disch. Cap./ mAh/g | 20 C Disch. Ener./ mWh/g | C/% |
|---|---|---|---|---|---|---|
| CX8-070 Mn0.350 Fe0.630 | Co0.010 Ni0.010 | 133.7 | 433.6 | 126.3 | 389.3 | 2.50 |
| CX8-071 Mn0.450 Fe0.530 | Co0.010 Ni0.010 | 137.7 | 457.7 | 130.0 | 409.3 | 2.55 |
| CX8-072 Mn0.500 Fe0.480 | Co0.010 Ni0.010 | 137.3 | 460.3 | 130.7 | 415.3 | 3.19 |
| CX8-073 Mn0.550 Fe0.430 | Co0.010 Ni0.010 | 134.3 | 453.7 | 127.3 | 406.3 | 2.43 |
| CX8-096 Mn0.650 Fe0.330 | Co0.010 Ni0.010 | 127.7 | 429.7 | 118.7 | 372.3 | 2.38 |
| CX8-097 Mn0.400 Fe0.560 | Co0.020 Ni0.020 | 133.3 | 429.7 | 125.3 | 381.7 | 2.64 |
| CX8-098 Mn0.500 Fe0.460 | Co0.020 Ni0.020 | 134.3 | 430.3 | 123.6 | 360.0 | 2.52 |
| CX8-099 Mn0.550 Fe0.410 | Co0.020 Ni0.020 | 130.3 | 434.7 | 123.3 | 386.7 | 2.47 |
| CX8-101 Mn0.400 Fe0.540 | Co0.030 Ni0.030 | 127.0 | 413.7 | 120.7 | 372.0 | 2.67 |
| CX8-103 Mn0.500 Fe0.440 | Co0.030 Ni0.030 | 124.7 | 411.7 | 116.7 | 360.0 | 2.46 |
| CX8-105 Mn0.500 Fe0.430 | Co0.035 Ni0.035 | 125.0 | 410.7 | 116.7 | 363.3 | 2.64 |

Figure 4:
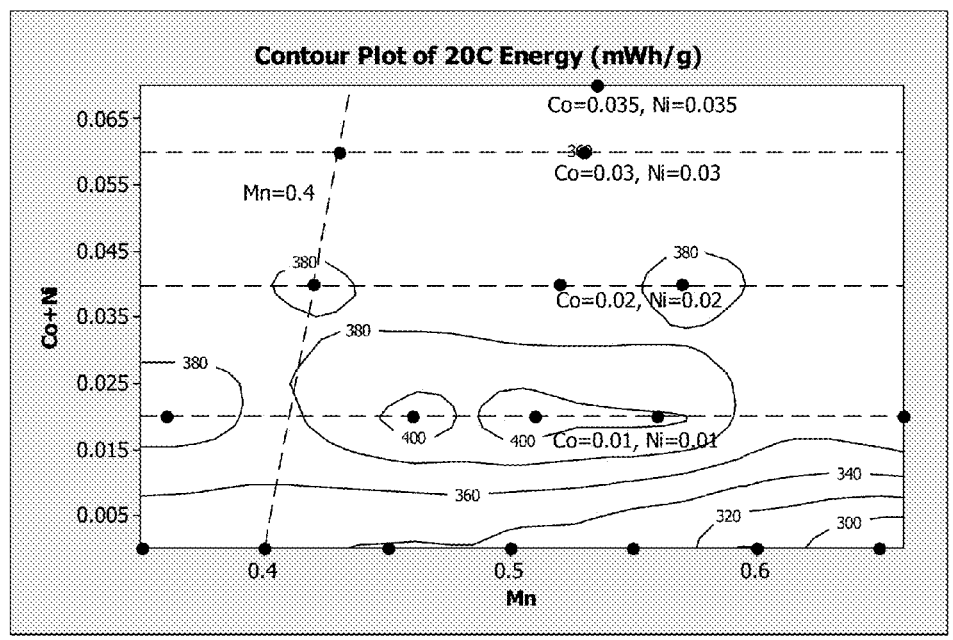
FIG. 4 is a contour plot of energy density as a function of Co, Ni dopant content and Mn content in a non-stoichiometric LFMP material doped with Co and/or Ni.

FIG. 4 is a plot of 20C discharge energy vs. Mn content and dopant (Co+Ni) content for cells including the various samples of Example 4 as positive electrode and lithium foil as negative electrode.

It should be noted that the highest 20C energy performance compositions from FIG. 4 is $Li_{1.025}Mn_{0.500}Fe_{0.480}Co_{0.010}Ni_{0.010}PO_4$ (415 mWh/g).

Example 5

Non-Stoichiometric LFMP Material Doped with Cobalt, Nickel, and Vanadium

Additional improvements were observed when lithium-rich LFMP material doped with cobalt, nickel, and vanadium were formulated. Five different groups of parameter space was explored.

In Group A, 5 mol % excess Li and 2.5 mol % excess $PO_4$ was used, doped with 3 mol % V. The amounts of Mn, Fe, Co and Ni were varied, as represented by $Li_{1.050}Mn_xFe_yCo_zNi_zV_{0.03}(PO_4)_{1.025}$, where $0.350 \leq x \leq 0.650$, $x+y+2z=0.970$ and $0.00 \leq z \leq 0.035$.

In Group B, the samples are represented by $Li_{1.040}Mn_xFe_yCo_zNi_zV_{0.020}(PO_4)_{1.015}$, where $0.400 \leq x \leq 0.600$, $x+y+2z=0.980$ and $0.00 \leq z \leq 0.0350$.

In Group C, the samples are represented by $Li_{1.030}Mn_xFe_yCo_zNi_zV_{0.010}(PO_4)_{1.005}$, where $0.400 \leq x \leq 0.600$, $x+y+2z=0.990$ and $0.00 \leq z \leq 0.035$.

In Group D, the samples are represented by $Li_{1.020+z}Mn_xFe_yCo_{0.010}Ni_{0.010}V_z(PO_4)_{0.995+z}$, where $x=0.450$, $x+y+z=0.980$ and $0.00 \leq z \leq 0.050$.

In Group E, the samples are represented by $Li_{1.040}Mn_xFe_yCo_zNi_wV_{0.020}(PO_4)_{1.015}$, where $x=0.45$, $x+y+z+w=0.98$, $0.00 \leq z \leq 0.030$ and $0.00 \leq w \leq 0.030$.

To prepare Co, Ni, and V doped LFMP materials noted in Groups A through E, $Li_2Co_3$, $FePO_4 \cdot xH_2O$, $Mn_3(PO_4)_2 \cdot H_2O$, $LiH_2PO_4$, $CoC_2O_4 \cdot 2H_2O$, $NiC_2O_4 \cdot 2H_2O$, $V_2O_5$ and alcohol soluble vinyl based copolymer precursors were mixed in a plastic milling jar containing YTZ zirconia grinding media and IPA for three days and then dried using a rotary evaporator. Materials are selected to provide the target molar % of each metal in the final product based on the metal assay in Certificate of Analysis provided by the manufacturer.

For example, to prepare 0.1M ($\approx$16 g) $Li_{1.050}Mn_{0.450}Fe_{0.500}Co_{0.010}Ni_{0.010}V_{0.030}(PO_4)_{1.025}$, 3.149 g $Li_2Co_3$, 9.663 g $FePO_4 \cdot xH_2O$, 6.267 g $Mn_3(PO_4)_2 \cdot xH_2O$, 2.166 g $LiH_2PO_4$, 0.183 g $CoC_2O_4 \cdot 2H_2O$, 0.183 g $NiC_2O_4 \cdot 2H_2O$, 0.273 g $V_2O_5$ and 0.947 g alcohol soluble vinyl based copolymer were used.

The dried powder was heated with a TPR (temperature programmed reaction) process in a tube furnace under an inert atmosphere. The heating profile was ramp from 25° C. to 350° C. in 0.5 hr, followed by hold at 350° C. for 0.5 hr, followed by ramp from 350° C. to 700° C. in 0.5 hr, followed by hold at 700° C. for 1 hr, followed by cooling down to 25° C. The finished product was milled and then stored in the absence of water.

The positive electrode slurry was prepared by dissolving 0.0225 g of PVDF-HFP copolymer commercially available as Kynar® 2801 from AtoFina in 1.496 g of acetone and dispersing in the resulting solution a dry mixture of 0.1612 g of doped LFMP prepared as described above and 0.0204 g of conductive carbon (Super P or Ensaco). The paste is homogenized in a vial using a Wig-L-Bug cast on one side of an aluminum foil current collector using a die casting apparatus, dried in an oven to remove the casting solvent and densified using a calendaring apparatus.

The positive electrode and lithium foil as the negative electrode were cut to proper dimensions and interposed with a glass fiber separator to form a Swagelok type half cell against lithium foil. First charge capacities (FCC's) along with capacity and energy were measured at the rates: C/5, C/2, 1C, 2C, 5C, 10C, 20C, 30C and 50C.

The results of the various measurements from Group A are shown in Table 5A below:

TABLE 5A

| Mat. # | Dopant | 10 C Disch. Cap./ mAh/g | 10 C Disch. Ener./ mWh/g | 20 C Disch. Cap./ mAh/g | 20 C Disch. Ener./ mWh/g | C/% |
|---|---|---|---|---|---|---|
| CX8-130 | Co0.000 | 139.3 | 463.3 | 130.0 | 408.0 | 2.68 |
| Mn0.400 | Ni0.000 | | | | | |
| Fe0.570 | V0.030 | | | | | |
| CX8-131 | Co0.000 | 138.3 | 450.0 | 123.3 | 375.0 | 2.65 |
| Mn0.450 | Ni0.000 | | | | | |
| Fe0.520 | V0.030 | | | | | |
| CX8-136 | Co0.000 | 138.3 | 459.7 | 125.0 | 388.3 | 2.56 |
| Mn0.500 | Ni0.000 | | | | | |
| Fe0.470 | V0.030 | | | | | |
| CX8-085 | Co0.010 | 142.0 | 469.3 | 135.0 | 420.3 | 2.62 |
| Mn0.350 | Ni0.010 | | | | | |
| Fe0.600 | V0.030 | | | | | |
| CX8-109 | Co0.010 | 136.3 | 450.3 | 130.7 | 410.0 | 2.55 |
| Mn0.400 | Ni0.010 | | | | | |
| Fe0.550 | V0.030 | | | | | |
| CX8-086 | Co0.010 | 140.3 | 472.3 | 134.0 | 424.0 | 2.65 |
| Mn0.450 | Ni0.010 | | | | | |
| Fe0.500 | V0.030 | | | | | |
| CX8-087 | Co0.010 | 137.7 | 465.0 | 130.7 | 415.7 | 2.62 |
| Mn0.500 | Ni0.010 | | | | | |
| Fe0.450 | V0.030 | | | | | |
| CX8-088 | Co0.010 | 137.7 | 466.0 | 129.7 | 411.7 | 2.59 |
| Mn0.550 | Ni0.010 | | | | | |
| Fe0.400 | V0.030 | | | | | |
| CX8-089 | Co0.010 | 127.7 | 432.3 | 116.7 | 367.0 | 2.42 |
| Mn0.650 | Ni0.010 | | | | | |
| Fe0.300 | V0.030 | | | | | |
| CX8-090 | Co0.020 | 123.0 | 406.7 | 114.7 | 354.0 | 2.67 |
| Mn0.400 | Ni0.020 | | | | | |
| Fe0.530 | V0.030 | | | | | |
| CX8-126 | Co0.020 | 137.3 | 459.7 | 129.3 | 407.7 | 2.70 |
| Mn0.450 | Ni0.020 | | | | | |
| Fe0.480 | V0.030 | | | | | |
| CX8-091 | Co0.020 | 135.7 | 457.0 | 128.3 | 404.7 | 2.64 |
| Mn0.500 | Ni0.020 | | | | | |
| Fe0.430 | V0.030 | | | | | |
| CX8-092 | Co0.020 | 135.0 | 450.3 | 125.7 | 387.3 | 2.55 |
| Mn0.550 | Ni0.020 | | | | | |
| Fe0.380 | V0.030 | | | | | |

Figure 5A:
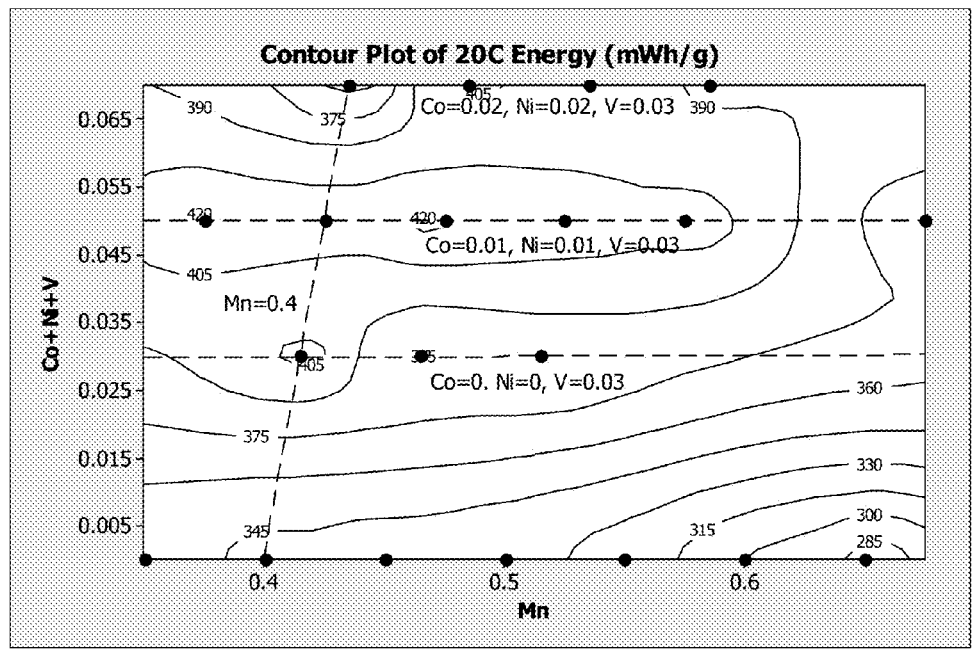
FIG. 5A is a contour plot of energy density as a function of Co, Ni dopant content and Mn content in a non-stoichiometric LFMP material doped with Co, Ni, and/or V, where V is held constant at 0.030 and Co, Ni are varied.

FIG. 5A is a plot of 20C discharge energy vs. Mn content and dopant (Co+Ni+V) content for cells including the various samples of Group A as positive electrode and lithium foil as negative electrode.

It should be noted that the highest 20C energy performance compositions from Table 5A is $Li_{1.050}Mn_{0.450}Fe_{0.500}Co_{0.010}Ni_{0.010}V_{0.030}(PO_4)_{1.025}$ (424 mWh/g).

The results of the various measurements from Group B are shown in Table 5B below:

TABLE 5B

| Mat. # | Dopant | 10 C Disch. Cap./ mAh/g | 10 C Disch. Ener./ mWh/g | 20 C Disch. Cap./ mAh/g | 20 C Disch. Ener./ mWh/g | C/% |
|---|---|---|---|---|---|---|
| CX8-150 | Co0.000 | 140.7 | 459.7 | 130.0 | 395.0 | 2.59 |
| Mn0.400 | Ni0.000 | | | | | |
| Fe0.580 | V0.020 | | | | | |
| CX8-151 | Co0.000 | 129.7 | 422.3 | 113.3 | 340.0 | 2.56 |
| Mn0.450 | Ni0.000 | | | | | |
| Fe0.530 | V0.020 | | | | | |
| CX8-152 | Co0.000 | 133.3 | 441.7 | 117.7 | 357.0 | 2.57 |
| Mn0.500 | Ni0.000 | | | | | |
| Fe0.480 | V0.020 | | | | | |
| CX9-001 | Co0.010 | 143.0 | 473.3 | 136.3 | 425.7 | 2.65 |
| Mn0.400 | Ni0.010 | | | | | |
| Fe0.560 | V0.020 | | | | | |
| CX9-002 | Co0.010 | 141.0 | 471.7 | 134.7 | 424.7 | 2.59 |
| Mn0.450 | Ni0.010 | | | | | |
| Fe0.510 | V0.020 | | | | | |
| CX9-003 | Co0.010 | 141.0 | 468.0 | 133.3 | 410.0 | 2.55 |
| Mn0.500 | Ni0.010 | | | | | |
| Fe0.460 | V0.020 | | | | | |
| CX9-004 | Co0.020 | 139.3 | 457.0 | 133.0 | 410.0 | 2.70 |
| Mn0.400 | Ni0.020 | | | | | |
| Fe0.540 | V0.020 | | | | | |
| CX9-005 | Co0.020 | 136.7 | 445.0 | 128.3 | 384.7 | 2.59 |
| Mn0.450 | Ni0.020 | | | | | |
| Fe0.490 | V0.020 | | | | | |
| CX9-006 | Co0.020 | 133.3 | 440.0 | 126.0 | 385.7 | 2.73 |
| Mn0.500 | Ni0.020 | | | | | |
| Fe0.440 | V0.020 | | | | | |

Figure 5B:
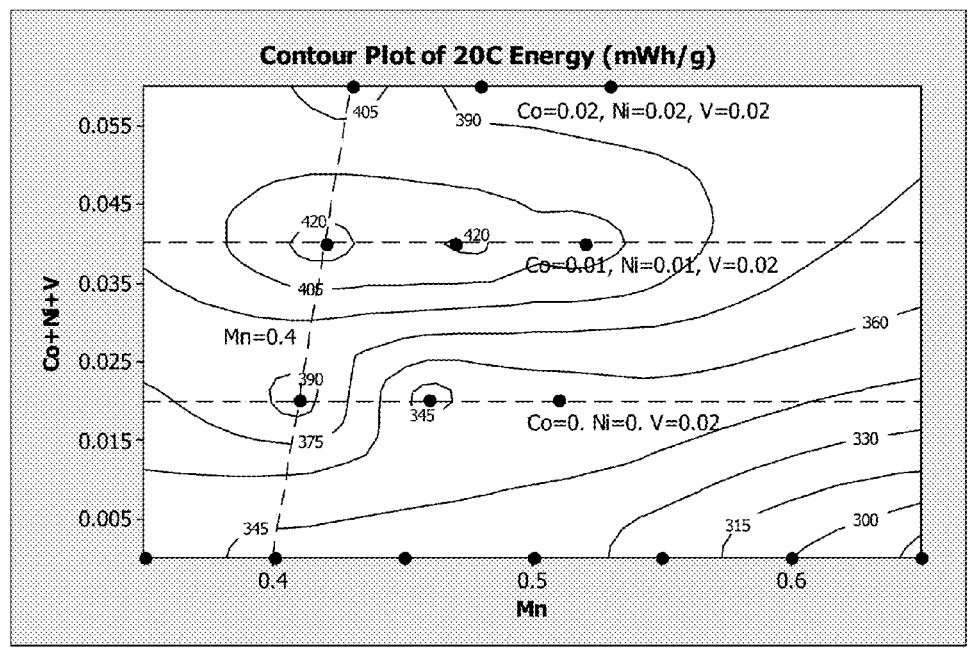
FIG. 5B is a contour plot of energy density as a function of Co, Ni dopant content and Mn content in a non-stoichiometric LFMP material doped with Co, Ni, and/or V, where V is held constant at 0.020 and Co, Ni are varied.

FIG. 5B is a plot of 20C discharge energy vs. Mn content and dopant (Co+Ni+V) content for cells including the various samples of Group B as positive electrode and lithium foil as negative electrode.

It should be noted that the highest 20C energy performance compositions from Table 5B are $Li_{1.040}Mn_{0.400}Fe_{0.560}Co_{0.010}Ni_{0.010}V_{0.020}(PO_4)_{1.015}$ (426 mWh/g) and $Li_{1.040}Mn_{0.450}Fe_{0.510}Co_{0.010}Ni_{0.010}V_{0.020}(PO_4)_{1.015}$ (425 mWh/g).

The results of the various measurements from Group C are shown in Table 5C below:

TABLE 5C

| Mat. # | Dopant | 10 C Disch. Cap./mAh/g | 10 C Disch. Ener./mWh/g | 20 C Disch. Cap./mAh/g | 20 C Disch. Ener./mWh/g | C/% |
|---|---|---|---|---|---|---|
| CX8-143 Mn0.400 Fe0.590 | Co0.000 Ni0.000 V0.010 | 138.7 | 453.7 | 129.0 | 398.0 | 2.53 |
| CX8-144 Mn0.450 Fe0.540 | Co0.000 Ni0.000 V0.010 | 136.0 | 440.3 | 122.3 | 368.7 | 2.53 |
| CX8-145 Mn0.500 Fe0.490 | Co0.000 Ni0.000 V0.010 | 131.7 | 428.7 | 119.0 | 360.3 | 2.50 |
| CX8-140 Mn0.400 Fe0.570 | Co0.010 Ni0.010 V0.010 | 131.3 | 422.0 | 113.3 | 337.7 | 2.61 |
| CX8-141 Mn0.450 Fe0.520 | Co0.010 Ni0.010 V0.010 | 136.3 | 447.7 | 126.0 | 386.3 | 2.57 |
| CX8-142 Mn0.500 Fe0.470 | Co0.010 Ni0.010 V0.010 | 127.7 | 404.7 | 109.3 | 313.0 | 2.53 |
| CX8-146 Mn0.400 Fe0.550 | Co0.020 Ni0.020 V0.010 | 131.0 | 422.7 | 121.3 | 366.0 | 2.50 |
| CX8-147 Mn0.450 Fe0.500 | Co0.020 Ni0.020 V0.010 | 132.3 | 436.0 | 123.0 | 380.7 | 2.60 |
| CX8-148 Mn0.500 Fe0.450 | Co0.020 Ni0.020 V0.010 | 134.7 | 442.0 | 122.0 | 370.3 | 2.58 |
| CX8-149 Mn0.450 Fe0.480 | Co0.030 Ni0.030 V0.010 | 99.0 | 322.3 | 88.7 | 264.0 | 1.88 |

Figure 5C:
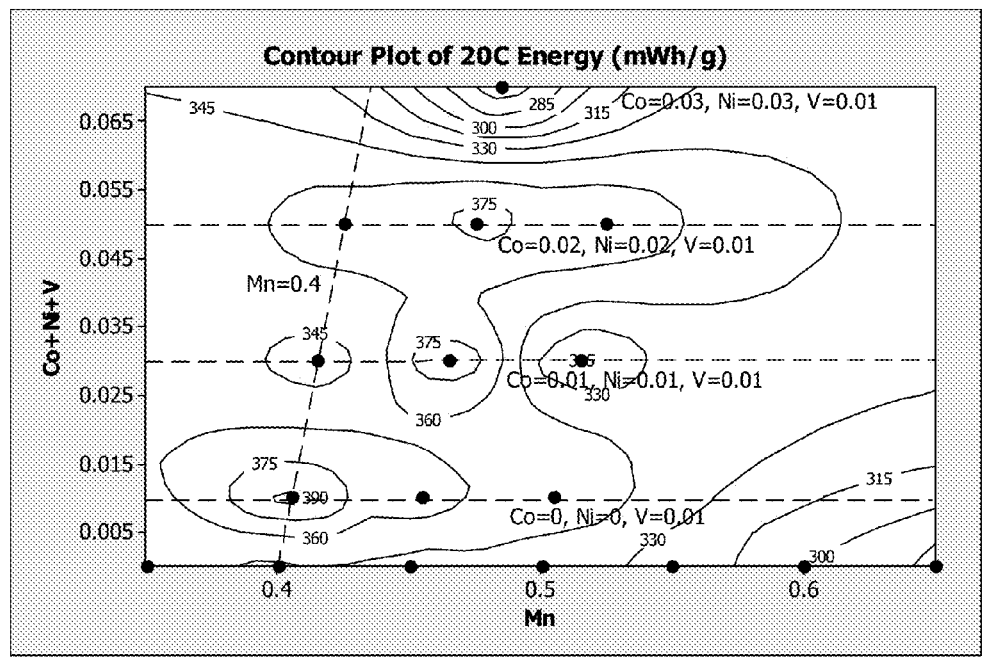
FIG. 5C is a contour plot of energy density as a function of Co, Ni dopant content and Mn content in a non-stoichiometric LFMP material doped with Co, Ni, and/or V, where V is held constant at 0.010 and Co, Ni are varied.

FIG. 5C is a plot of 20C discharge energy vs. Mn content and dopant (Co+Ni+V) content for cells including the various samples of Group C as positive electrode and lithium foil as negative electrode.

It should be noted that the highest 20C energy performance compositions from Table 5C is $Li_{1.030}Mn_{0.450}Fe_{0.520}Co_{0.010}Ni_{0.010}V_{0.010}(PO_4)_{1.005}$ (386 mWh/g).

The results of the various measurements from Group D are shown in Table 5D below:

TABLE 5D

| Mat. # | Dopant | 10 C Disch. Cap./mAh/g | 10 C Disch. Ener./mWh/g | 20 C Disch. Cap./mAh/g | 20 C Disch. Ener./mWh/g | C/% |
|---|---|---|---|---|---|---|
| CX8-144 Mn0.450 Fe0.520 | Co0.010 Ni0.010 V0.010 | 136.0 | 440.3 | 122.3 | 368.7 | 2.53 |
| CX9-002 Mn0.450 Fe0.510 | Co0.010 Ni0.010 V0.020 | 141.0 | 471.7 | 134.7 | 424.7 | 2.59 |
| CX8-086 Mn0.450 Fe0.500 | Co0.010 Ni0.010 V0.030 | 140.3 | 472.3 | 134.0 | 424.0 | 2.65 |
| CX9-008 Mn0.450 Fe0.490 | Co0.010 Ni0.010 V0.040 | 136.7 | 455.7 | 129.3 | 399.7 | 2.75 |
| CX9-009 Mn0.450 Fe0.480 | Co0.010 Ni0.010 V0.050 | 136.7 | 453.0 | 127.3 | 391.0 | 2.94 |

It should be noted that the highest 20C energy performance compositions from Table 5D are $Li_{1.040}Mn_{0.450}Fe_{0.510}Co_{0.010}Ni_{0.010}V_{0.020}(PO_4)_{1.015}$ (425 mWh/g) and $Li_{1.050}Mn_{0.450}Fe_{0.500}Co_{0.010}Ni_{0.010}V_{0.030}(PO_4)_{1.025}$ (424 mWh/g).

The results of the various measurements from Group E are shown in Table 5E below:

TABLE 5E

| Mat. # | Dopant (Co + Ni + V <= 0.06) Co | Ni | V | 10 C Disch. Cap./mAh/g | 10 C Disch. Ener./mWh/g | 20 C Disch. Cap./mAh/g | 20 C Disch. Ener./mWh/g | C/% |
|---|---|---|---|---|---|---|---|---|
| CX9-038 Mn0.450 Fe0.520 | 0.010 | 0.000 | 0.020 | 142.0 | 467.0 | 131.0 | 369.0 | 2.76 |
| CX9-039 Mn0.450 Fe0.510 | 0.020 | 0.000 | 0.020 | 138.0 | 453.3 | 128.0 | 385.0 | 2.62 |
| CX9-037 Mn0.450 Fe0.500 | 0.030 | 0.000 | 0.020 | 131.0 | 437.0 | 122.0 | 367.0 | 2.74 |
| CX9-036 Mn0.450 Fe0.490 | 0.040 | 0.000 | 0.020 | 135.0 | 427.0 | 123.0 | 350.0 | 2.65 |
| CX9-002 Mn0.450 Fe0.510 | 0.010 | 0.010 | 0.020 | 141.0 | 471.7 | 134.7 | 424.7 | 2.59 |
| CX9-034 Mn0.450 Fe0.500 | 0.020 | 0.010 | 0.020 | 140.0 | 468.0 | 133.0 | 415.0 | 2.89 |

TABLE 5E-continued

| Mat. # | Dopant (Co + Ni + V <= 0.06) | | | 10 C Disch. | | 20 C Disch. | | C/% |
|---|---|---|---|---|---|---|---|---|
| | Co | Ni | V | Cap./mAh/g | Ener./mWh/g | Cap./mAh/g | Ener./mWh/g | |
| CX9-035 Mn0.450 Fe0.490 | 0.030 | 0.010 | 0.020 | 132.3 | 429.7 | 117.0 | 346.0 | 2.66 |
| CX9-032 Mn0.450 Fe0.500 | 0.010 | 0.020 | 0.020 | 139.3 | 464.0 | 131.3 | 408.0 | 2.75 |
| CX9-005 Mn0.450 Fe0.490 | 0.020 | 0.020 | 0.020 | 136.7 | 445.0 | 128.3 | 385.7 | 2.59 |
| CX9-033 Mn0.450 Fe0.490 | 0.010 | 0.030 | 0.020 | 136.0 | 446.0 | 126.3 | 383.3 | 2.83 |

It should be noted that the highest 20C energy performance compositions from Table 5E is $Li_{1.040}Mn_{0.450}Fe_{0.510}Co_{0.010}Ni_{0.010}V_{0.020}(PO_4)_{1.015}$ (425 mWh/g).

Therefore, in Example 5, Groups A, B, D, and E all demonstrate that energy density as high as about 425 mWh/g can be achieved using Co, Ni, and V doped LFMP materials (e.g., $Li_{1.050}Mn_{0.450}Fe_{0.500}Co_{0.010}Ni_{0.010}V_{0.030}(PO_4)_{1.025}$ and $Li_{1.040}Mn_{0.450}Fe_{0.510}Co_{0.010}Ni_{0.010}V_{0.020}(PO_4)_{1.015}$).

Example 6

Non-Stoichiometric LFMP Material Doped with Cobalt, Nickel, Vanadium, and Fluorine Additional improvements were observed when lithium-rich LFMP material doped with cobalt, nickel, vanadium, and fluorine were formulated. In this study, materials represented by $Li_{1.040}Mn_{0.450}Fe_{0.510}Co_{0.010}Ni_{0.010}V_{0.020}(PO_4)_{1.015-x/3}F_x$ were prepared, where $0.00 \leq x \leq 0.060$.

To prepare Co, Ni, V, and F doped LFMP material noted above, $Li_2CO_3$, $FePO_4 \cdot xH_2O$, $Mn_3(PO_4)_2 \cdot H_2O$, $LiH_2PO_4$, $CoC_2O_4 \cdot 2H_2O$, $NiC_2O_4 \cdot 2H_2O$, $NH_4F$ and alcohol soluble vinyl based copolymer precursors were mixed in a plastic milling jar containing YTZ zirconia grinding media and IPA for three days and then dried using a rotary evaporator. Materials are selected to provide the target molar % of each metal in the final product based on the metal assay in Certificate of Analysis provided by the manufacturer.

For example, to prepare 0.1M (≈16 g) $Li_{1.040}Mn_{0.450}Fe_{0.510}Co_{0.010}Ni_{0.010}V_{0.020}(PO_4)_{1.010}F_{0.015}$, 3.266 g $Li_2CO_3$, 9.856 g $FePO_4 \cdot xH_2O$, 6.267 g $Mn_3(PO_4)_2 \cdot xH_2O$, 1.732 g $LiH_2PO_4$, 0.170 g $NH_4CoPO_4$, 0.238 g $Ni_3(PO_4)_2 \cdot xH_2O$, 0.182 g $V_2O_5$, 0.069 g $NH_4F$ and 0.947 g alcohol soluble vinyl based copolymer were used.

The dried powder was heated with a TPR (temperature programmed reaction) process in a tube furnace under an inert atmosphere. The heating profile was ramp from 25° C. to 350° C. in 0.5 hr, followed by hold at 350° C. for 0.5 hr, followed by ramp from 350° C. to 700° C. in 0.5 hr, followed by hold at 700° C. for 1 hr, followed by cooling down to 25° C. The finished product was milled and then stored in the absence of water.

The positive electrode slurry was prepared by dissolving 0.0225 g of PVDF-HFP copolymer commercially available as Kynar® 2801 from AtoFina in 1.496 g of acetone and dispersing in the resulting solution a dry mixture of 0.1612 g of doped LFMP prepared as described above and 0.0204 g of conductive carbon (Super P or Ensaco). The paste is homogenized in a vial using a Wig-L-Bug cast on one side of an aluminum foil current collector using a die casting apparatus, dried in an oven to remove the casting solvent and densified using a calendaring apparatus.

The positive electrode and lithium foil as the negative electrode were cut to proper dimensions and interposed with a glass fiber separator to form a Swagelok type half cell against lithium foil. First charge capacities (FCC's) along with capacity and energy were measured at the rates: C/5, C/2, 1C, 2C, 5C, 10C, 20C, 30C and 50C.

The results of the various measurements from $Li_{1.040}Mn_{0.450}Fe_{0.510}Co_{0.010}Ni_{0.010}V_{0.030}(PO_4)_{1.010}F_{0.015}$ are shown in Table 6 below along with $Li_{1.040}Mn_{0.450}Fe_{0.510}Co_{0.010}Ni_{0.010}V_{0.020}(PO_4)_{1.015}$ from Example 5 above:

TABLE 6

| Mat.# | FCC/ mAh/g | C/5 Disch. Cap./ mAh/g | 2 C Disch. Cap./ mAh/g | 2 C Disch. Ener./ mWh/g | 10 C Disch. Cap./ mAh/g | 20 C Disch. Cap./ mAh/g | 20 C Disch. Ener./ mWh/g | C % |
|---|---|---|---|---|---|---|---|---|
| M1x w/o F | 156.0 | 155.0 | 150.0 | 532.0 | 141.0 | 134.7 | 424.7 | 2.59 |
| M1x w/ F | 160.7 | 159.0 | 152.7 | 549.3 | 145.0 | 140.3 | 453.3 | 2.58 |

As shown, the 20C energy performance for $Li_{1.040}Mn_{0.450}Fe_{0.510}Co_{0.010}Ni_{0.010}V_{0.030}(PO_4)_{1.010}F_{0.015}$ (453 mWh/g) is about 6.7% superior to that observed in Example 5 for $Li_{1.040}Mn_{0.450}Fe_{0.510}Co_{0.010}Ni_{0.010}V_{0.020}(PO_4)_{1.015}$ (425 mWh/g).

Example 7

Figure 6:
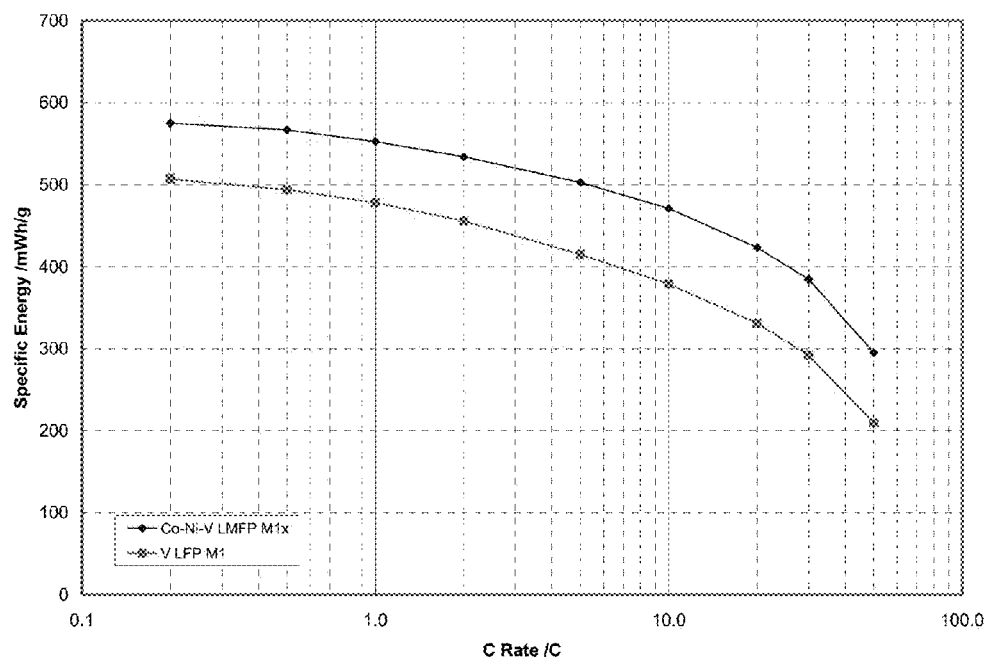
FIG. 6 is a plot comparing the specific energy as a function of C rate for $Li_{1.030}Fe_{0.970}V_{0.030}PO_4$ and $Li_{1.050}Mn_{0.450}Fe_{0.500}Co_{0.010}Ni_{0.010}V_{0.030}(PO_4)_{1.025}$.

Comparison of $Li_{1.030}Fe_{0.970}V_{0.030}(PO_4)$ with $Li_{1.050}Mn_{0.450}Fe_{0.500}Co_{0.010}Ni_{0.010}V_{0.030}(PO_4)_{1.025}$ The energy density of $Li_{1.03}Fe_{0.97}V_{0.03}PO_4$, which can be found in Example 2 of US 2009/0186277, is compared with the energy density of $Li_{1.050}Mn_{0.450}Fe_{0.500}Co_{0.010}Ni_{0.010}V_{0.030}(PO_4)_{1.025}$. As shown below in Table 7 and in FIG. 6, there is a substantial increase in the energy density at all discharge rates. For example, the $Li_{1.050}Mn_{0.450}Fe_{0.500}Co_{0.010}Ni_{0.010}V_{0.030}(PO_4)_{1.025}$ composition (identified as "Co—Ni—V M1x" in Table 7 and "Co—Ni—V LMFP M1x" in FIG. 6) was able to achieve approximately 424 mWh/g at 20C whereas the $Li_{1.030}Fe_{0.970}V_{0.030}PO_4$ composition (identified as "V M1" in Table 7 and "V LFP M1" in FIG. 6) showed 331 mWh/g.

TABLE 7

| Materials | Specific Energy/mWh/g | | | | | | | |
|---|---|---|---|---|---|---|---|---|
| | 0.2 C | 0.5 C | 1 C | 2 C | 5 C | 10 C | 20 C | 50 C |
| Co—Ni-VM1x | 575 | 567 | 553 | 534 | 503 | 472 | 424 | 295 |
| VM1 | 507 | 494 | 478 | 456 | 415 | 380 | 331 | 209 |

Experiment 8

Elemental Analysis by STEM

Elemental analysis of the various Co and Ni doped LFMP nanoparticles was performed by scanning transmission electron microscopy (STEM) using JEOL 2010 FEG TEM equipped with an Oxford Instruments X-ray detector and INCA analyzer for x-ray microanalysis.

Figure 7:
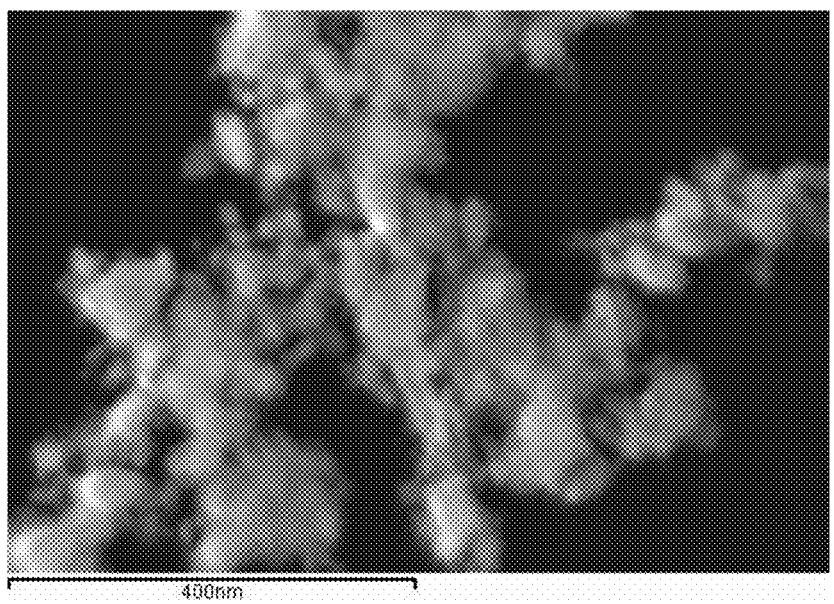
FIG. 7 shows a STEM image of nanoparticles of a sample having Mn 45%, Fe 50%, Co 1%, Ni 1%, V 3%.
Figure 8:
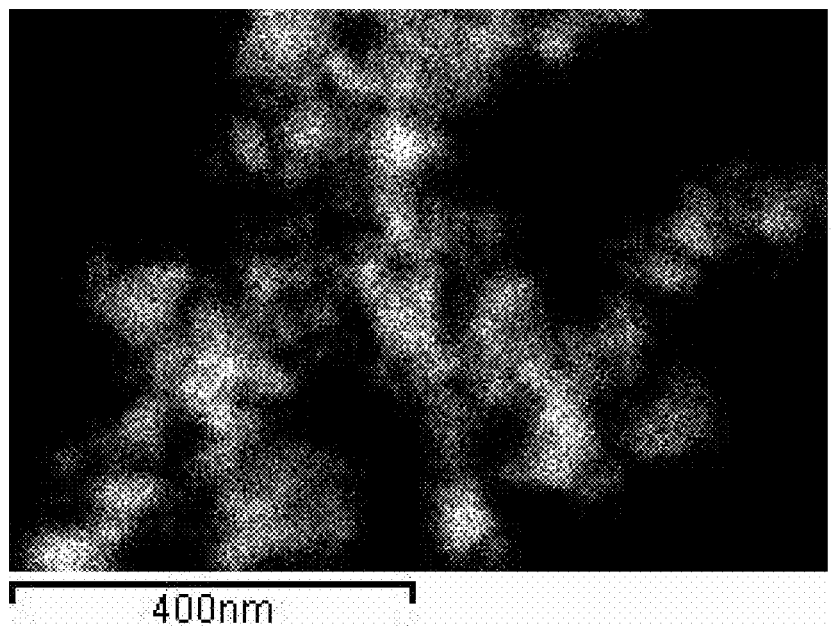
FIG. 8 shows the corresponding energy-dispersive X-ray (EDX) mapping of the sample of FIG. 7 for Fe.
Figure 9:
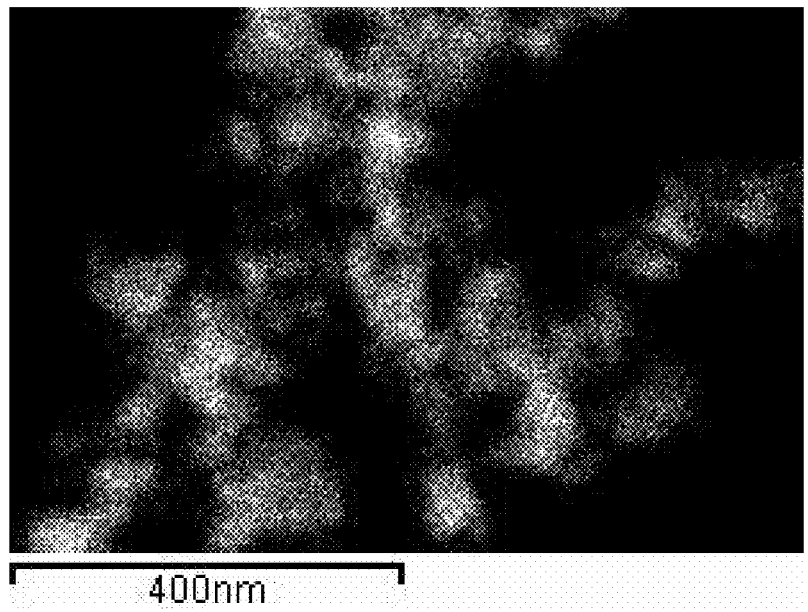
FIG. 9 show the corresponding energy-dispersive X-ray (EDX) mapping of the sample of FIG. 7 for Mn.
Figure 10:
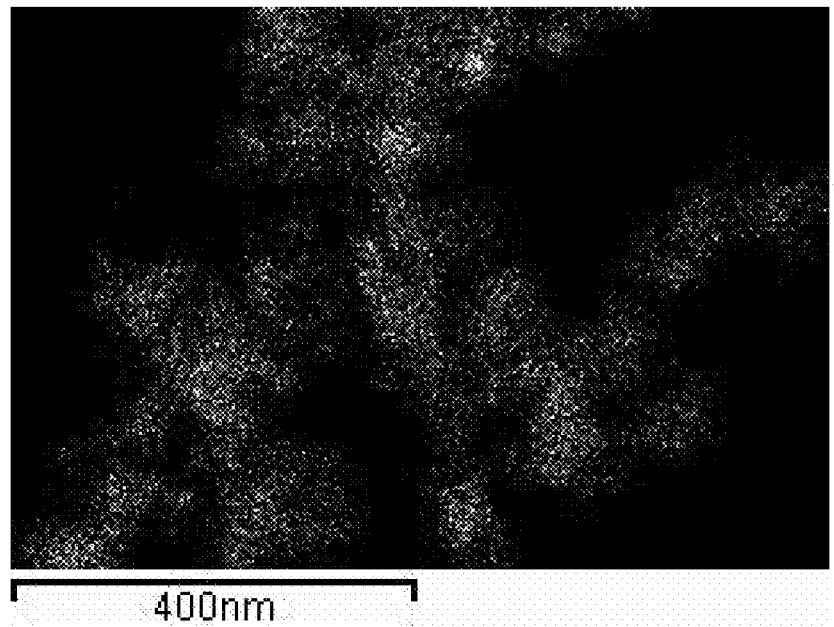
FIG. 10 show the corresponding energy-dispersive X-ray (EDX) mapping of the sample of FIG. 7 for Co.
Figure 11:
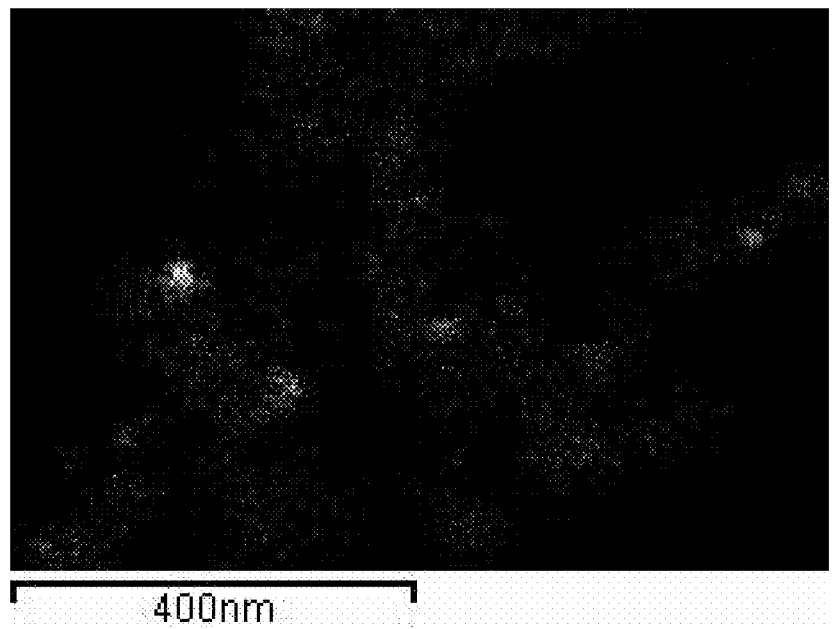
FIG. 11 show the corresponding energy-dispersive X-ray (EDX) mapping of the sample of FIG. 7 for Ni.
Figure 12:
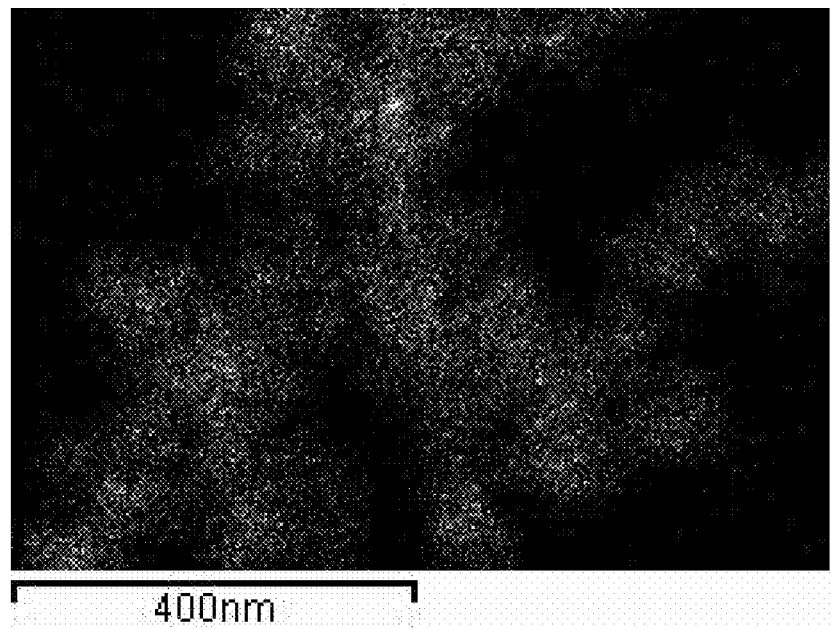
FIG. 12 show the corresponding energy-dispersive X-ray (EDX) mapping of the sample of FIG. 7 for V.

FIG. 7 shows a STEM image of nanoparticles of the sample CX8-086 ($Li_{1.050}Mn_{0.450}Fe_{0.500}Co_{0.010}Ni_{0.010}V_{0.030}(PO_4)_{1.025}$), and FIGS. 8, 9, 10, 11, 12 show the corresponding energy-dispersive X-ray (EDX) mapping of Fe, Mn, Co, Ni, and V, respectively. Fe, Mn, Co, and V appear to be uniformly distributed throughout the particles. However, there are regions where Ni is enriched, indicating that there are Ni-rich secondary phases. High-resolution X-ray energy spectrum analysis also confirmed the existence of Ni-rich regions. Similar results were obtained from the sample CX8-071 ($Li_{1.025}Mn_{0.450}Fe_{0.530}Co_{0.010}Ni_{0.010}PO_4$), that is uniform distribution of Fe, Mn, Co throughout the particles and existence of Ni-rich regions. For the sample CX8-067 ($Li_{1.025}Mn_{0.450}Fe_{0.510}Co_{0.040}PO_4$), Fe and Mn are uniformly distributed throughout the particles, but there are regions where Co is enriched, indicating that there are Co-rich secondary phases. High-resolution X-ray energy spectrum analysis also confirmed the existence of Co-rich regions in the CX8-067 sample.

The results indicate that Co is present as a solid solution in the olivine structure, and that the solubility is greater than 1 mol % but less than 4 mol %. Ni is slightly less soluble than Co, and the solubility is less than 1 mol %.

Without wishing to be bound by theory, the samples exhibiting the highest energy density were observed to exist as a solid solution while Co-rich and Ni-rich secondary phases were found in samples showing lower energy density.

Example 9

Water-Based Non-Stoichiometric LFMP Material Doped with Cobalt, Nickel, and Vanadium Water-based LFMP material synthetic route is environmentally friendly and has a further advantage of lower cost. Lithium-rich LFMP material doped with cobalt, nickel, and vanadium were also synthesized with water-based milling process. Similar capacity and energy performance was observed with the LFMP material synthesized with water based milling process as compared to the results discussed above.

The formulation of LFMP material synthesized with water-base milling process was $Li_{1.050}Mn_{0.450}Fe_{0.510}Co_{0.010}Ni_{0.005}V_{0.025}(PO_4)_{1.020}$.

To prepare water-based Co, Ni, and V doped LFMP materials, $Li_2CO_3$, $FePO_4 \cdot xH_2O$, $Mn_3(PO_4)_2 \cdot H_2O$, $LiH_2PO_4$, $CoC_2O_4 \cdot 2H_2O$, $NiC_2O_4 \cdot 2H_2O$, $NH_4VO_3$, water soluble vinyl based copolymer or sugar precursors, and water were mixed in a plastic jar with a Silverson Mixer for 30 minutes at 5,000 RPM, and the water slurry was then milled in MicroCer HEM (high energy mill) for 30 minutes at 3,000 RPM. The slurry was spray dried to powder with B-290 Mini Spray Dryer.

Materials are selected to provide the target molar % of each metal in the final product based on the metal assay in Certificate of Analysis provided by the manufacturer. For example, to prepare 0.5M (≈80 g) $Li_{1.050}Mn_{0.450}Fe_{0.510}Co_{0.010}Ni_{0.005}V_{0.025}(PO_4)_{1.020}$, 16.034 g $Li_2CO_3$, 49.245 g $FePO_4 \cdot xH_2O$, 31.318 g $Mn_3(PO_4)_2 \cdot xH_2O$, 10.015 g $LiH_2PO_4$, 0.915 g $CoC_2O_4 \cdot 2H_2O$, 0.457 g $NiC_2O_4 \cdot 2H_2O$, 1.462 g $NH_4VO_3$ and 7.099 g sugar were used.

The dried powder was heated with a TPR (temperature programmed reaction) process in a tube furnace under an inert atmosphere. The heating profile was ramp from 25° C. to 350° C. in 0.5 hr, followed by hold at 350° C. for 0.5 hr, followed by ramp from 350° C. to 700° C. in 0.5 hr, followed by hold at 700° C. for 1 hr, followed by cooling down to 25° C. The finished product was milled and then stored in the absence of water.

The positive electrode slurry was prepared by dissolving 0.0225 g of PVDF-HFP copolymer commercially available as Kynar® 2801 from AtoFina in 1.496 g of acetone and dispersing in the resulting solution a dry mixture of 0.1612 g of doped LFMP prepared as described above and 0.0204 g of conductive carbon (Super P or Ensaco). The paste is homogenized in a vial using a Wig-L-Bug cast on one side of an aluminum foil current collector using a die casting apparatus, dried in an oven to remove the casting solvent and densified using a calendaring apparatus.

The positive electrode and lithium foil as the negative electrode were cut to proper dimensions and interposed with a glass fiber separator to form a Swagelok type half cell against lithium foil. First charge capacities (FCC's) along with capacity and energy were measured at the rates: C/5, C/2, 1C, 2C, 5C, 10C, 20C, 30C and 50C.

$Li_{1.050}Mn_{0.45}Fe_{0.51}Co_{0.010}Ni_{0.005}V_{0.025}(PO_4)_{1.020}$ was also prepared in accordance with the process described in Example 6 (i.e., using IPA). The results of the various measurements from water-based and IPA-based LFMP materials are shown in Table 8 below:

TABLE 8

| Mat.# | FCC/ mAh/g | C/5 Disch. Cap./ mAh/g | 2 C Disch. Cap./ mAh/g | 2 C Disch. Ener./ mWh/g | 10 C Disch. Cap./ mAh/g | 20 C Disch. Cap./ mAh/g | 20 C Disch. Ener./ mWh/g | C % |
|---|---|---|---|---|---|---|---|---|
| CX10-018 (IPA) | 154.7 | 154.3 | 149.7 | 537.0 | 141.7 | 136.3 | 439.0 | 2.56 |
| CX11-091 (water) | 159.7 | 157.3 | 149.7 | 539.0 | 139.0 | 132.2 | 423.0 | 1.72 |

It should be noted that the capacity and energy performance of water-based LFMP material is very similar to that of the IPA-based LFMP material, and the 20C discharge energy of water-based LFMP material is 423 mWh/g.

Upon review of the description and embodiments described above, those skilled in the art will understand that modifications and equivalent substitutions may be performed in carrying out the invention without departing from the essence of the invention. Thus, the invention is not meant to be limiting by the embodiments described explicitly above.

What is claimed is:

1. A positive electrode material, comprising:
an electroactive material having an overall composition comprising lithium (Li), iron (Fe), manganese (Mn), one or more dopants (D), and phosphate ($PO_4$), wherein the amount of Fe+Mn+D=1.0;
a ratio of an amount of Li:(Fe+Mn+D) ranges from greater than 1.0 to 1.05;
a ratio of an amount of $PO_4$:(Fe+Mn+D) ranges from greater than 1.0 to 1.025;
D is one or more dopants each selected from the group consisting of cobalt (Co), nickel (Ni), vanadium (V), and niobium (Nb);
an element amount of Mn ranges from 0.35 to 0.60;
an amount of D ranges from about 0.001 to about 0.10; and
the electroactive material comprises at least one phase having an olivine structure comprising said Li, Fe, Mn, D, and phosphate; and
wherein the combination of the excess lithium with the amount of Mn has an energy density of at least 250 mWh/g and a specific capacity of at least 100 mAh/g at a 20C discharge rate during operation in a battery cell of the electroactive material.

2. The positive electrode material as claimed in claim 1, wherein the positive electrode material is capable of providing an energy density of at least 340 m Wh/g at 20C discharge rate during operation in a battery cell.

3. The positive electrode material as claimed in claim 1, said electroactive material further comprising fluorine substituted at a phosphate lattice site.

4. The positive electrode material as claimed in claim 1, wherein D comprises at least one dopant comprising Co at an amount of up to about 0.05.

5. The positive electrode material as claimed in claim 1, wherein D comprises at least one dopant comprising Co at an amount of up to about 0.03.

6. The positive electrode material as claimed in claim 1, wherein D comprises more than one dopants comprising an amount of Co up to about 0.05 and an amount of Ni up to about 0.035.

7. The positive electrode material as claimed in claim 1, wherein D comprises more than one dopants comprising an amount of Co up to about 0.02 and an amount of Ni up to about 0.02.

8. The positive electrode material as claimed in claim 1, wherein D comprises more than one dopants comprising an amount of Co up to about 0.05, an amount of Ni up to about 0.035, and an amount of V up to about 0.05.

9. The positive electrode material as claimed in claim 1, wherein D comprises more than one dopants comprising an amount of Co up to about 0.02, an amount of Ni up to about 0.02, and an amount of V up to about 0.04.

10. The positive electrode material as claimed in claim 1, wherein the electroactive material comprises an amount of Co up to about 0.05, an amount of Ni up to about 0.035, an amount of V up to about 0.05, and an amount of F up to about 0.06.

11. The positive electrode material as claimed in claim 1, wherein the electroactive material comprises an amount of Co up to about 0.02, an amount of Ni up to about 0.02, an amount of V up to about 0.04, and an amount of F up to about 0.025.

12. The positive electrode material as claimed in claim 1, wherein the positive electrode material is one or more electroactive materials selected from the group consisting of $Li_{1.050}Mn_{0.450}Fe_{0.500}Co_{0.010}Ni_{0.010}V_{0.030}(PO_4)_{1.025}$,
$Li_{1.040}Mn_{0.400}Fe_{0.560}Co_{0.010}Ni_{0.010}V_{0.020}(PO_4)_{1.015}$,
$Li_{1.040}Mn_{0.450}Fe_{0.520}Co_{0.010}Ni_{0.010}V_{0.020}(PO_4)_{1.015}$,
$Li_{1.030}Mn_{0.450}Fe_{0.520}Co_{0.010}Ni_{0.010}V_{0.010}(PO_4)_{1.005}$,
$Li_{1.040}Mn_{0.450}Fe_{0.510}Co_{0.010}Ni_{0.010}V_{0.030}(PO_4)_{1.010}F_{0.015}$,
$Li_{1.050}Mn_{0.450}Fe_{0.510}Co_{0.0100}Ni_{0.005}V_{0.025}(PO_4)_{1.020}$,
$Li_{1.050}Mn_{0.450}Fe_{0.500}Co_{0.010}Ni_{0.010}V_{0.030}(PO_4)_{1.025}$,
$Li_{1.040}Mn_{0.400}Fe_{0.560}Co_{0.010}Ni_{0.010}V_{0.020}(PO_4)_{1.015}$,
$Li_{1.040}Mn_{0.450}Fe_{0.510}Co_{0.010}Ni_{0.010}V_{0.020}(PO_4)_{1.015}$,
$Li_{1.030}Mn_{0.450}Fe_{0.520}Co_{0.010}Ni_{0.010}V_{0.010}(PO_4)_{1.005}$,
$Li_{1.040}Mn_{0.450}Fe_{0.510}Co_{0.010}Ni_{0.010}V_{0.030}(PO_4)_{1.010}F_{0.015}$, and
$Li_{1.050}Mn_{0.450}Fe_{0.510}Co_{0.0100}Ni_{0.005}V_{0.025}(PO_4)_{1.020}$.

13. The positive electrode material as claimed in claim 1, wherein the positive electrode material is one or more electroactive materials selected from the group consisting of $Li_{1.050}Mn_{0.450}Fe_{0.500}Co_{0.010}Ni_{0.010}V_{0.030}(PO_4)_{1.025}$,
$Li_{1.040}Mn_{0.400}Fe_{0.560}Co_{0.010}Ni_{0.010}V_{0.020}(PO_4)_{1.015}$,
$Li_{1.040}Mn_{0.450}Fe_{0.510}Co_{0.010}Ni_{0.010}V_{0.020}(PO_4)_{1.015}$,
$Li_{1.040}Mn_{0.450}Fe_{0.510}Co_{0.010}Ni_{0.010}V_{0.030}(PO_4)_{1.010}F_{0.015}$,
$Li_{1.050}Mn_{0.450}Fe_{0.510}Co_{0.010}Ni_{0.025}V_{0.025}(PO_4)_{1.020}$,
$Li_{1.050}Mn_{0.450}Fe_{0.500}Co_{0.010}Ni_{0.010}V_{0.030}(PO_4)_{1.025}$,
$Li_{1.040}Mn_{0.400}Fe_{0.560}Co_{0.010}Ni_{0.010}V_{0.020}(PO_4)_{1.015}$,
$Li_{1.040}Mn_{0.450}Fe_{0.510}Co_{0.010}Ni_{0.010}V_{0.020}(PO_4)_{1.015}$,
$Li_{1.040}Mn_{0.450}Fe_{0.510}Co_{0.010}Ni_{0.010}V_{0.030}(PO_4)_{1.010}F_{0.015}$, and
$Li_{1.050}Mn_{0.450}Fe_{0.510}Co_{0.010}Ni_{0.005}V_{0.025}(PO_4)_{1.020}$.

14. The positive electrode material as claimed in claim 1, wherein the positive electrode material consists essentially of an olivinic phase.

15. The positive electrode material as claimed in claim 1, wherein the positive electrode material consists essentially of an olivinic phase and dopant-rich secondary phases.

16. The positive electrode material as claimed in claim 1, wherein the positive electrode material is capable of providing an energy density of at least 340 m Wh/g and a specific capacity of at least 110 mAh/g at 20C discharge rate during operation in a battery cell.

17. The positive electrode material as claimed in claim 1, wherein the positive electrode material is capable of providing an energy density of at least 400 m Wh/g and a specific capacity of at least 125 mAh/g at 20C discharge rate during operation in a battery cell.

18. The positive electrode material as claimed in claim 1, wherein D is one or more dopants wherein each dopant is selected from the group consisting of cobalt (Co), vanadium (V), and niobium (Nb).

19. The positive electrode material as claimed in claim 1, wherein D is one or more dopants wherein each dopant is selected from the group consisting of cobalt (Co) and vanadium (V).

20. A positive electrode comprising the positive electrode material of claim 1.

21. The positive electrode as claimed in claim 20, further comprising fluorine.

22. The positive electrode as claimed in claim 20, wherein the positive electrode material is capable of providing an energy density of at least 340 m Whig and a specific capacity of at least 110 mAh/g at 20C discharge rate during operation in a battery cell.

23. The positive electrode as claimed in claim 20, wherein D is one or more dopants wherein each dopant is selected from the group consisting of cobalt (Co), vanadium (V), and niobium (Nb).

24. The positive electrode as claimed in claim 20, wherein D is one or more dopants wherein each dopant is selected from the group consisting of cobalt (Co) and vanadium (V).

25. A lithium secondary cell, comprising:
   a positive electrode in electrical contact with a positive electrode current collector, said current collector in electrical connection with an external circuit;
   a negative electrode in electrical contact with a negative electrode current collector, said current collector in electrical connection with the external circuit;
   a separator positioned between and in ionic contact with a cathode and an anode;
   an electrolyte in ionic contact with the positive and negative electrodes;
   wherein the positive electrode comprises the positive electrode material of claim 1;
   wherein the positive electrode further comprises fluorine as a dopant material; and
   wherein the positive electrode material is cap able of providing an energy density of at least 340 mWh/g and a specific capacity of at least 110 mAh/g at 20C discharge rate during operation in a battery cell.

26. The lithium secondary cell as claimed in claim 25, wherein D is one or more dopants wherein each dopant is selected from the group consisting of cobalt (Co), vanadium (V), and niobium (Nb).

27. The lithium secondary cell as claimed in claim 25, wherein D is one or more dopants wherein each dopant is selected from the group consisting of cobalt (Co) and vanadium (V).

\* \* \* \* \*